United States Patent
McCarthy et al.

(10) Patent No.: US 11,605,065 B2
(45) Date of Patent: Mar. 14, 2023

(54) SYSTEMS AND METHODS FOR SECURE REMOTE COMMERCE

(71) Applicant: Mastercard International Incorporated, Purchase, NY (US)

(72) Inventors: Michael D. McCarthy, Denver, CO (US); Edward Neil Livingston, Fife (GB); Sachin Ahuja, Millstone Township, NJ (US); Holger Kunkat, Neumuenster (DE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 23 days.

(21) Appl. No.: 16/549,858

(22) Filed: Aug. 23, 2019

(65) Prior Publication Data

US 2020/0065789 A1     Feb. 27, 2020

Related U.S. Application Data

(60) Provisional application No. 62/722,712, filed on Aug. 24, 2018.

(51) Int. Cl.
  *G06Q 20/20*     (2012.01)
  *G06Q 30/06*     (2012.01)
  *G06Q 30/0601*   (2023.01)

(52) U.S. Cl.
  CPC ....... *G06Q 20/206* (2013.01); *G06Q 30/0641* (2013.01)

(58) Field of Classification Search
  CPC ............. G06Q 20/206; G06Q 30/0641; G06Q 20/204; G06Q 20/20
  See application file for complete search history.

(56) References Cited

U.S. PATENT DOCUMENTS 6,098,053 A    8/2000  Slater
8,196,131 B1 * 6/2012  von Behren ....... G06Q 20/3563
                                                717/168

(Continued)

FOREIGN PATENT DOCUMENTS

CA    3042357 A1 *  5/2018  ......... G06Q 20/3278
CA    3007992 A1 * 12/2018

(Continued)

OTHER PUBLICATIONS

X. Li, W. Zhu and M. He, "Secure remote mobile payment architecture and application," 2010 International Symposium on Computer, Communication, Control and Automation (3CA), Tainan, 2010, pp. 487-490, doi: 10.1109/3CA.2010.5533752. (Year: 2010).*

(Continued)

*Primary Examiner* — Ashford S Hayles
(74) *Attorney, Agent, or Firm* — Buckley, Maschoff & Talwalkar LLC

(57) ABSTRACT

Some embodiments may provide systems, methods and computer program code to facilitate a secure remote transaction and may include detecting an event identifying initiation of a checkout process involving a transaction between a consumer and a merchant, identifying a secure remote commerce system to use in facilitating the transaction, the secure remote commerce system storing a consumer profile including information identifying at least a first payment card of the consumer. In some embodiments, a checkout user interface displayed to the consumer is modified based on information from the consumer profile to display information associated with the at least one payment card. A checkout request from the consumer and a payload is obtained from the secure remote commerce system including information identifying the at least first payment card, the merchant and transaction details. The payload is used to (Continued)

complete a transaction authorization request with a payment network.

16 Claims, 18 Drawing Sheets

(56) References Cited

U.S. PATENT DOCUMENTS

| | | | | |
|---|---|---|---|---|
| 9,471,913 | B1* | 10/2016 | Kaptcan | G06Q 30/06 |
| 10,257,185 | B2* | 4/2019 | Wong | G07C 9/27 |
| 10,467,615 | B1* | 11/2019 | Omojola | G06Q 20/32 |
| 10,902,421 | B2* | 1/2021 | Badenhorst | G06Q 20/42 |
| 11,030,329 | B2* | 6/2021 | Jamkhedkar | H04L 67/16 |
| 2001/0044787 | A1* | 11/2001 | Shwartz | G06Q 20/12 |
| | | | | 705/78 |
| 2002/0152180 | A1* | 10/2002 | Turgeon | G06Q 20/4012 |
| | | | | 705/72 |
| 2006/0161975 | A1* | 7/2006 | Diez | H04L 67/10 |
| | | | | 726/18 |
| 2006/0235795 | A1* | 10/2006 | Johnson | G06Q 20/40 |
| | | | | 705/44 |
| 2007/0186277 | A1* | 8/2007 | Loesch | G06F 21/34 |
| | | | | 726/4 |
| 2010/0063895 | A1* | 3/2010 | Dominguez | H04L 63/166 |
| | | | | 705/26.1 |
| 2010/0065629 | A1* | 3/2010 | Wentker | G06Q 20/40 |
| | | | | 235/382 |
| 2011/0035294 | A1* | 2/2011 | Mizrah | G06Q 20/385 |
| | | | | 705/26.42 |
| 2011/0289004 | A1* | 11/2011 | Prakash | G06Q 20/223 |
| | | | | 705/71 |
| 2012/0101939 | A1* | 4/2012 | Kasower | G06Q 40/025 |
| | | | | 705/39 |
| 2012/0203696 | A1* | 8/2012 | Morgan | G06Q 20/384 |
| | | | | 705/44 |
| 2012/0311322 | A1* | 12/2012 | Koyun | G06F 21/42 |
| | | | | 713/156 |
| 2012/0316992 | A1* | 12/2012 | Oborne | G06Q 20/386 |
| | | | | 705/26.41 |
| 2013/0091058 | A1* | 4/2013 | Huster | G06Q 20/322 |
| | | | | 705/44 |
| 2013/0151400 | A1* | 6/2013 | Makhotin | G06Q 20/3229 |
| | | | | 705/39 |
| 2014/0101036 | A1* | 4/2014 | Phillips | G06Q 20/322 |
| | | | | 705/39 |
| 2014/0122301 | A1* | 5/2014 | Tamassia | G06Q 30/02 |
| | | | | 705/26.82 |
| 2014/0281506 | A1* | 9/2014 | Redberg | H04L 63/10 |
| | | | | 713/159 |
| 2015/0019443 | A1* | 1/2015 | Sheets | G06Q 20/322 |
| | | | | 705/71 |
| 2015/0032625 | A1* | 1/2015 | Dill | G06Q 20/4016 |
| | | | | 705/44 |
| 2015/0088756 | A1* | 3/2015 | Makhotin | G06Q 20/32 |
| | | | | 705/71 |
| 2015/0332262 | A1* | 11/2015 | Lingappa | G06Q 20/322 |
| | | | | 705/71 |
| 2015/0332291 | A1* | 11/2015 | Gillooly | G06Q 20/202 |
| | | | | 705/7.29 |
| 2015/0339666 | A1* | 11/2015 | Wilson | G06Q 20/40 |
| | | | | 705/44 |
| 2016/0092696 | A1* | 3/2016 | Guglani | G06F 21/335 |
| | | | | 726/26 |
| 2016/0210626 | A1* | 7/2016 | Ortiz | G06Q 20/023 |
| 2016/0239840 | A1* | 8/2016 | Preibisch | G06Q 20/3829 |
| 2017/0017958 | A1* | 1/2017 | Scott | G06Q 20/12 |
| 2017/0053301 | A1* | 2/2017 | Khan | G06Q 20/322 |
| 2017/0116635 | A1* | 4/2017 | Gantert | G06Q 20/10 |
| 2017/0295155 | A1* | 10/2017 | Wong | H04L 67/306 |
| 2017/0300909 | A1* | 10/2017 | Bansal | G06Q 20/027 |
| 2018/0137511 | A1* | 5/2018 | Arnold | G06Q 20/3226 |
| 2018/0198614 | A1* | 7/2018 | Neumann | H04L 9/321 |
| 2018/0268411 | A1* | 9/2018 | Voidman | G06Q 20/409 |
| 2018/0285868 | A1* | 10/2018 | O'Hara | G06Q 20/401 |
| 2018/0293573 | A1* | 10/2018 | Ortiz | G06Q 20/20 |
| 2018/0315038 | A1* | 11/2018 | Rezayee | H04W 76/10 |
| 2018/0315051 | A1* | 11/2018 | Hurley | G06Q 20/4016 |
| 2019/0005479 | A1* | 1/2019 | Glaser | G06Q 20/208 |
| 2019/0007421 | A1* | 1/2019 | D | H04L 63/0807 |
| 2019/0019185 | A1* | 1/2019 | Chitalia | G06Q 20/38215 |
| 2019/0087814 | A1* | 3/2019 | Lassouaoui | H04W 12/06 |
| 2019/0172046 | A1* | 6/2019 | Ignatchenko | G06F 21/84 |
| 2019/0394200 | A1* | 12/2019 | Godier | H04L 9/321 |

FOREIGN PATENT DOCUMENTS

| | | | | |
|---|---|---|---|---|
| WO | WO-2017122156 | A1* | 7/2017 | G06Q 30/0241 |
| WO | 2018141047 | A | 8/2018 | |
| WO | WO-2019171163 | A1* | 9/2019 | H04L 9/3231 |

OTHER PUBLICATIONS

R. Abdellaoui and M. Pasquet, "Secure Communication for Internet Payment in Heterogeneous Networks," 2010 24th IEEE International Conference on Advanced Information Networking and Applications, Perth, WA, 2010, pp. 1085-1092, doi: 10.1109/AINA.2010.45. (Year: 2010).*

T. Chang, "A Secure Cloud-Based Payment Model for M-Commerce," 2013 42nd International Conference on Parallel Processing, Lyon, 2013, pp. 1082-1086, doi: 10.1109/ICPP.2013.129. (Year: 2013).* https://www.emvco.com/document-search/?action=search_documents &emvco_document_technology[]=secure-remote-commerce (Year: 2017).*

Sherif, Mostafa Hashem. Protocols for Secure Electronic Commerce. Baton Rouge: Taylor & Francis Group, 2003. Print. (Year: 2003).*

International Search Report and Written Opinion dated Nov. 14, 2019 which was issued in connection with PCT Application No. PCT/US19/047940 which was filed on Aug. 23, 2019.

* cited by examiner

SYSTEMS AND METHODS FOR SECURE REMOTE COMMERCE

RELATED APPLICATIONS

This application is based on and claims benefit of and priority to U.S. Provisional Patent Application Ser. No. 62/722,712 filed on Aug. 24, 2019, the contents of which are hereby incorporated in their entirety for all purposes.

BACKGROUND

Payment cards have been accepted in online transactions since the 1990's. Online shopping (or "remote commerce") continues to increase in popularity. A typical online transaction involves a number of entities, including the cardholder, the merchant, a payment gateway, and the payment card networks. The integrations between each of these entities is not standardized, fragmented and inconsistent. For example, a merchant wishing to allow online customers to purchase goods from the merchant's website may be required to perform one or more integrations between the merchant's website and one or more payment gateways. Frequently, because sensitive payment account data is entered into the merchant's website, the merchant is required to undergo complex and expensive Payment Card Industry Data Security Standard ("PCI-DSS") compliance preparation and audits. The merchant then needs to maintain and support those integrations and the PCI-DSS compliance. Unfortunately, these existing approaches require that sensitive cardholder information be provided to merchants which can result in unauthorized or unintentional exposure of sensitive payment data.

It would be desirable to standardize these integrations and provide consumers and merchants with a consistent consumer experience that is secure and which does not require the provision of sensitive cardholder information to merchants.

SUMMARY OF THE INVENTION

According to some embodiments, systems, methods and computer program code are provided to facilitate a secure remote transaction and may include detecting an event identifying initiation of a checkout process involving a transaction between a consumer and a merchant, identifying a secure remote commerce system to use in facilitating the transaction, the secure remote commerce system storing a consumer profile including information identifying at least a first payment card of the consumer. In some embodiments, a checkout user interface displayed to the consumer is modified based on information from the consumer profile. A checkout request from the consumer and a payload is obtained from the secure remote commerce system including information identifying the at least first payment card, the merchant and transaction details. The payload is used to complete a transaction authorization request with a payment network.

In some embodiments, the secure remote commerce system is identified by transmitting a request message to a plurality of secure remote commerce systems with information associated with the consumer and a device operated by the consumer. In some embodiments, one of the plurality of secure remote commerce systems recognizes the consumer and the device, and that system is identified as the system for use in completing the transaction. In some embodiments, none of the plurality of secure remote commerce systems recognize the consumer or the device and an identity verification process may be performed. In some embodiments, none of the plurality of secure remote commerce systems recognize the consumer or the device, and the identity verification process is unsuccessful, and the consumer is prompted to enroll a payment card.

In some embodiments, identifying the consumer and the device may include verifying a bearer token associated with at least one of the consumer and the device.

A technical effect of some embodiments of the invention is an improved and secure way to standardize checkout interactions at diverse merchants. With these and other advantages and features that will become hereinafter apparent, a more complete understanding of the nature of the invention can be obtained by referring to the following detailed description and to the drawings appended hereto.

DETAILED DESCRIPTION

In general, and for the purpose of introducing concepts of embodiments of the present disclosure, embodiments provide a standardized integration between consumers, merchants and payment networks for secure online transactions.

The present invention provides significant technical improvements to facilitate secure online commerce interactions. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic commerce by providing benefits in security, user experience, and reduced integration complexity and such advances are not merely a longstanding commercial practice.

Figure 1:
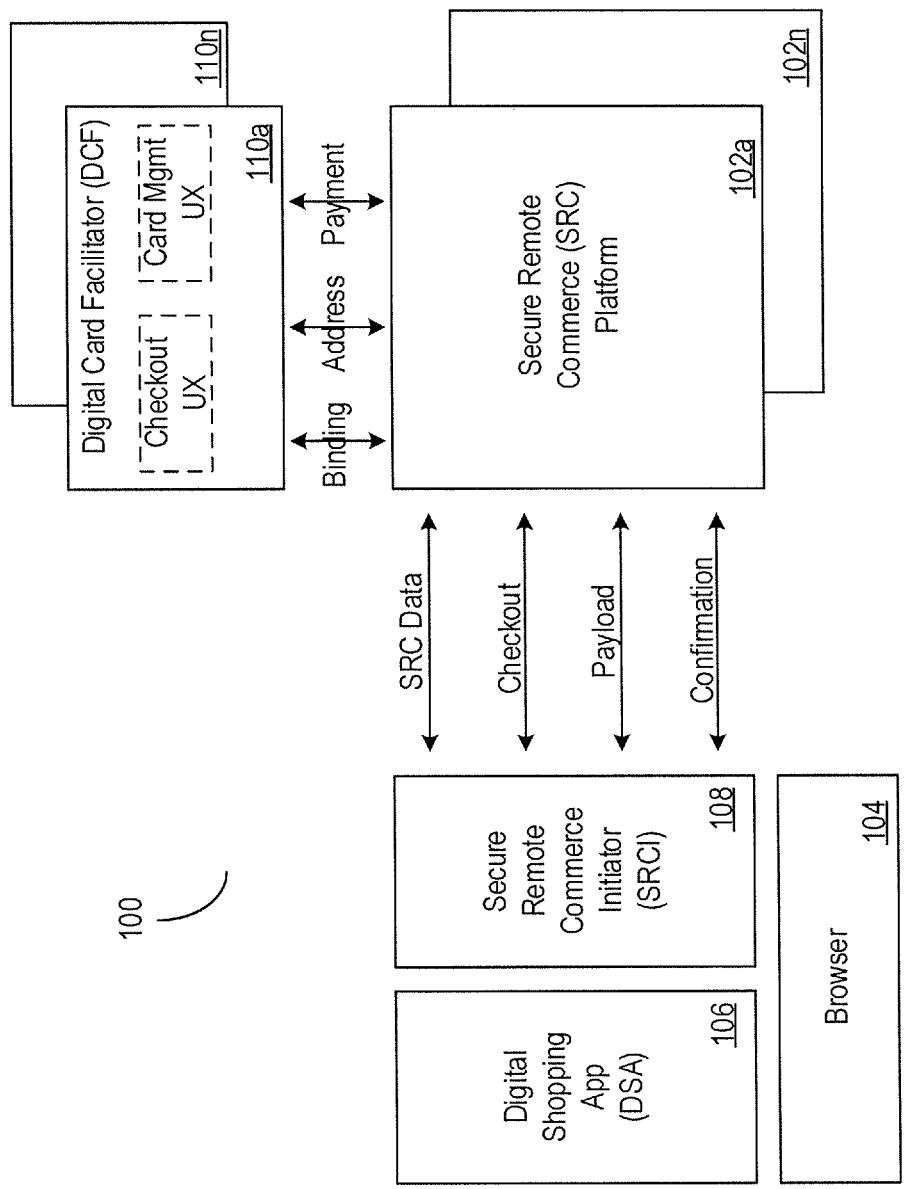
FIG. 1 is a block diagram of a secure remote commerce system pursuant to some embodiments.

FIG. 1 is a high-level block diagram of a transaction system 100 according to some embodiments of the present invention. In particular, the system 100 includes a number of components that interact as described herein to allow transactions to be completed. In general, many of the interactions between components are via application programming interfaces ("APIs") which will be described further herein. As shown, the system 100 includes a secure remote commerce (SRC) system 102

The SRC system 102 generally operates to orchestrate messages and transactions between transaction participants using the API methods described further herein. In some embodiments, a number of SRC systems 102a-n may be in the system 100. Each of the SRC systems 102a-n may be operated by or on behalf of different entities to facilitate transactions. For example, each SRC system 102 may be operated by, for example, a payment network (such as Mastercard International Incorporated or other network providers). Other entities may also operate SRC systems 102. Each SRC system 102 coordinates messages and transactions among transaction participants (including the customer, the DSA 106, the SRCI 108 and the DCF 110) in order to facilitate remote card payments pursuant to the present invention. A number of the messages and interactions facilitated by the SRC system 102 will be described by reference to transaction flows in FIGS. 3-6 discussed further below. While the SRC system 102, the DSA 106, the SRCI 108 and the DCF 110 are generally referred to herein as "participants" or "components" they may also be generally described as "roles". For example, the role of the DCF 110 may be performed by an application that may be a part of a larger application that also performs the role of the SRCI 108.

The DCF 110 is generally operated to provide a user experience for consumers during a transaction. More particularly, the DCF 110 provides consumers with a user interface (or portions of a user interface) that may be used during a checkout process and/or for card management (when card data is stored in the consumer's profile or the SRC profile at an SRC 102). For example, the DCF 110 may provide user interfaces (or portions thereof) to facilitate billing address entry, shipping address entry and selection, consumer profile creation, binding of payment cards and addresses to SRC profiles, as well as user interfaces to facilitate consumer/payment assurance challenges (e.g., such as for use with 3D Secure authentication processes or the like). A number of DCFs 110a-110n may be in the system 100. Each of the DCFs 110 may be operated by or on behalf of different entities. For example, a DCF 110 may be operated by an entity that also operates an SRC 102. As another example, a DCF 110 may be operated by or on behalf of an financial account issuer, a merchant, a browser provider, or the like.

The SRCI 108 is generally operated to facilitate the collection and transmission of digital card and checkout information on behalf of a DSA 106 to enable the initialization of a payment transaction. The SRCI 108 in some embodiments is responsible for securely exchanging data with a SRC system 102 (including providing checkout data to the SRC system 102). The SRCI 108 also securely receives payload information from the SRC system 102 for use in completing a payment transaction using that payload. In some embodiments, a number of SRCIs may be provided in a system 100. Each SRCI 108 may be operated, for example, by or on behalf of a merchant (e.g., such as by a merchant service provider or the like).

The DSA 106 is generally operated to facilitate the consumer experience during a secure commerce transaction. A DSA 106 may be, for example, a web or mobile application to allow a consumer to purchase goods or services from a merchant, marketplace or other service provider. A number of DSAs are typically provided in a system 100. Each DSA 106 may be operated by, or on behalf of, a merchant, a marketplace, or a service provider that operates to maintain, administer and manage hosted order pages on behalf of merchants or marketplaces. The DSA 106 is not necessarily limited to shopping applications, it may also be an application to facilitate other types of payment transactions (and thus, may also be referred to as a digital payment application (or "DPA")).

The browser 104 is a web browser or other application associated with a user device operated by a consumer interacting with DSA 106.

As shown in FIG. 1, a number of message types are shown as passing between different entities or devices. These message types are shown for illustrative purposes and more detailed information about messages will be provided in conjunction with a discussion of FIGS. 2-7. Messages between the SRCI 108 and the SRC system 102 include SRC data and checkout data. This information may include, for example, profile data (including, for example DSA information), credentials to facilitate the secure exchange of data, consumer data (such as the consumer's email and mobile number), shipping information, transaction information and user device information. Other messages between the SRCI 108 and SRC system 102 include payload data which is created by the SRC system 102 and sent to the SRCI 108 to enable payment authorization to be performed. The payload data may include consumer information (such as, for example, email and phone number), information identifying the digital card selected for use in the transaction by the user, shipping address information, consumer verification response data, transaction information, etc. A confirmation API method may allow an SRCI 108 to notify the SRC 102 about the status or outcome of the transaction (and may include a transaction identifier as well as a status or status code).

As shown in FIG. 1, there are a number of message flows that involve user interfaces provided by the DCF 110. For example, when a consumer profile is created or updated or when device or consumer information is bound to a profile, the DCF 110 may be involved to provide an appropriate user interface for the interaction. Other services that may involve user interfaces from the DCF 110 include a payment service which may be used to request the generation of transaction credentials which can be used to transact through an acquiring channel (e.g., in an authorization request). The payment service may include identification information (such as the appInstanceIdentifier) as well as input parameters to generate transaction credentials (such as the consumer's selected cardId, a shippingAddressId, a transaction amount and other optional information). In response, a transactionId is provided to identify the transaction as well as an expiration date of the transactionId. Another example of interactions that may involve user interfaces from the DCF 110, are binding interactions when a consumer's identifier and other consumer contact details are bound (or associated with) to an enrolled card or to an established customer account profile, identified by an appInstanceIdentifier. A message to bind a device to a consumer was described above. As another example, a bind consumer method may be invoked (typically by a DCF 110) and may include the appInstanceIdentifier, and may optionally include an appInstanceAuthorization JWT object or a cardAuthorization JWT object. If the cardAuthorization is provided it is used to validate the session and identify the card to which the consumer details should be bound (and will attempt to create a new customer account profile on the SRC system 102). Otherwise, if appInstanceAuthorization is provided it is used to identify the existing customer account profile to which the supplied customer details should be bound. If an authorization object is not included in the request header, then the appInstanceIdentifier must be provided. If both the appInstanceIdentifier and an authorization object are provided, both must map to the same customer profile. The result of the use of these various combinations of authorizations and identifiers (such as the appIntanceIdentifier) is a system that allows a wide variety of disparate entities to securely participate and communicate with each other.

Although not explicitly shown in FIG. 1, another participant in transactions pursuant to the present invention are one or more financial institutions that function as acquirers or issuers of payment accounts that are used by consumers participating in secure remote commerce transactions pursuant to the present invention. Issuers operate to enroll the consumer (also referred to herein as a "cardholder") and one or more payment account numbers (or "PANs") of the consumer. Acquirers perform the standard payment function of performing authorizations of transactions involving payment accounts issued by that issuer.

The SRC system 102 and/or the other elements of the system 100 might be, for example, associated with a Personal Computer ("PC"), laptop computer, smartphone, an enterprise server, a server farm, and/or a database or similar storage devices. As used herein, devices, including those associated with the SRC system 102 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks. Note that the system 100 of FIG. 1 is provided only as an example, and embodiments may be associated with additional elements or components.

Prior to discussing transaction flows pursuant to some embodiments, several data elements and transaction concepts of the present invention will be described. First, the API methods and messages of the present invention rely on a number of authorization concepts to ensure that consumers, devices, applications and other entities are authorized to perform an interaction. Digital authorization data is provided to ensure such authorizations. Digital Authorization data will contain a reference to an appInstance, consumer, or client merchant that has cards or other information about a customer bound to it. Therefore, this digital authorization will serve as both an assertion that the requestor is authorized to retrieve or modify that data as well as the identification of which data is to be retrieved or modified.

Pursuant to some embodiments, the digital authorization is assumed to be a JSON Web Token ("JWT" or "JWT token") pursuant to Internet Engineering Task Force (IETF) RFC 7519. This token must be signed by the SRC system 102a-n that issued it (RSA256). Every SRC system 102a-n should be able to validate this token using an SRC's public key. The payload of the JWT token will be base 64 encoded and should contain the network id of the issuing SRC system 102a-n as the first parameter. Each JWT must include the "issued at" claim to certify when it was issued (iat). In some embodiments, digital authorization data is provided for applications, consumers, clients, and devices (referred to in the flow diagrams respectively as "appInstanceAuthorization", "consumerAuthorization", "clientAuthorization", and "cardAuthorization").

These digital authorizations are allowed to propagate within the SRC system 100 with the following requirements. First, a JWT issued by one SRC provider 102a-n must be acceptable to all the other SRC providers 102a-n as a valid authentication token. Next, each SRC provider 102a-n must validate the JWT signature, must also validate that the issuer matches the signer, and must validate that the JWT has not expired. These rules provide predictability and security throughout the system 100.

The appInstanceAuthorization is a long-lived authorization that is meant to allow access to cards and/or consumer information that has been bound to a consumer's browser, mobile app, or other type of device. This App Instance Digital Authorization is intended to enable 'recognized' use cases where a user can access some portion of their data without any form of authentication. The appInstanceAuthorization should contain a unique identifier that corresponds to the device in question. This identifier can be generated off of a hash of a device fingerprint.

The consumerAuthorization (or Consumer Digital authorization) is a short lived authorization that is used to certify that the user has already authenticated themselves during this session (e.g. enabling the consumer to lookup their cards following validation of their consumer identifier), or the consumer authorization data has been accessed following presentation of a long lived authorization, e.g. an appInstanceAuthorization. The consumerAuthorization should contain the identity and the type of identity that can be used to lookup their account profile. It should also contain a correlation id since it is a session authorization.

The clientAuthorization (or Client Digital authorization) will be used in order to certify that the payload can be accessed by the requesting SRCI 108. This is meant to enable the payload retrieval by the merchant server (or the DSA). This authorization can also be a long-lived authorization that is meant to allow access to cards that have been bound to a merchant or SRCI 108. This is meant to enable a card on file use case where a list of cards would only be useable for a single merchant because they were converted from existing cards on file. The clientAuthorization should contain a unique identifier that corresponds to the client server in question. This identifier is generated by the onboarding SRC system 102a-n and does not need to be respected by any other SRC System.

The cardAuthorization (or Card Digital authorization) is a short-lived authorization that is meant to certify that this session is the same session where the card was originally enrolled. This is meant to enable the registration during checkout flow and the guest checkout flow. The cardAuthorization should contain a unique identifier that corresponds to the card in question. This identifier can be generated by the enrolling SRC system 102a-n and does not need to be respected by any other SRC system 102a-n. It should also contain a correlation ID since it is a session authorization.

When an authorization involves a browser (e.g., the authorization is in a web-channel), a consumer identity is established via a natural-identifier such as the consumer's email and/or phone number. A user is authenticated via an out of band communication which validates user's access to the stated identifier (telephone device or email). Recognized users are issued a cryptographically signed JWT vouching for the user's identity. In addition, authenticated users may be "recognized" on a target device via an appInstanceId cookie value. As such, user identity may be present on every API call either in the appInstanceIdentifier or Authorization header with Bearer prefix, as per RFC standards. Identity for web-based clients will be established via Referrer header on incoming API requests, which, in turn will be validated against a white-list of allowed domains, as per RFC standards. In scenarios outside of web, such as native mobile applications, the application must be configured to self-identify via a clientId parameter. Invocations where both referrer and clientId are absent will be rejected by the SRC system 102.

These authorizations are used, for example, as bearer tokens in conjunction with the various APIs described herein which allow the devices and entities of system 100 to securely interact with each other. While not all API methods require an authorization, those that involve sensitive information or that change a profile or cause a device to be trusted do require an authorization in the request header. For example, one of the API methods which will be described further herein is a payload request method. An entity (typically an SRCI 108) will make a payload request to an SRC 102 in order to receive an encrypted payload which contains a consumer's selected payment card information. Even though the payload is encrypted (typically with a public key of the SRCI 108 that is interacting with the consumer) it is important to authenticate the identity of the SRCI 108 to ensure that the encrypted payload is provided to authenticated entities. In order to accomplish this, embodiments require that the payload request include an authorization (bearer) token in the API request header. In particular, in this example, the token is the clientAuthorization JWT object (properly signed by a SRC 102 in the system 100). This is provided to ensure the receiving SRC 102 is able to correctly identify and authorize.

Other API methods described herein may include other bearer tokens based on the situation and the requestor. For example, another type of API method that may be used in the system 100 are methods that cause a user device to be trusted by a SRC 102. These methods require that authorization tokens be included in request headers. For example, a request to authorize a device may include information about the device (such as user agent information) as well as a bearer token such as a consumerAuthorization JWT object or a cardAuthorization JWT object. If cardAuthorization is provided, it is used to validate the session and identify the card to which the App Instance should be bound (which will attempt to create a new customer account profile on the SRC 102). Otherwise, if consumerAuthorization is provided, it is used to identify the existing customer account profile to which the supplied App Instance should be bound. If the receiving SRC 102 is able to authenticate the token(s), it responds with an "appInstanceIdentifier" which is used to identify the connecting application instance in future sessions. Other bearer tokens may be used, although JWT tokens are believed to provide particularly desirable results in systems of the present invention.

Figure 2:
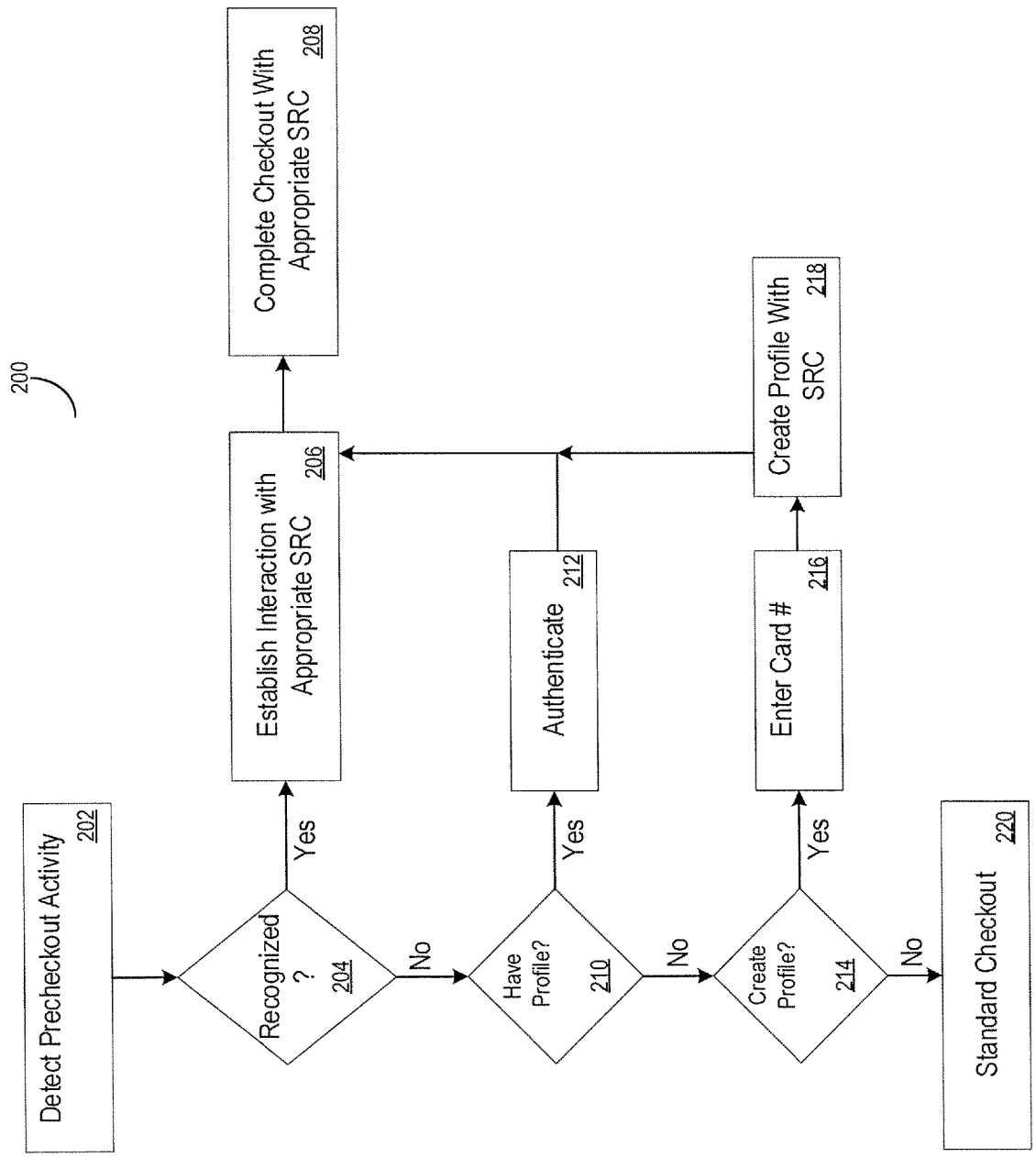
FIG. 2 illustrates a method according to some embodiments of the present invention.

With these authentication and authorization concepts established, reference is now made to FIG. 2 which illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 200 of FIG. 2 generally relates to processing performed before a checkout process is completed. For example, the process 200 may be performed when a consumer performs some action to initiate a checkout. Pursuant to some embodiments, this pre-checkout processing allows a more consistent and secure user experience across merchants and across payment systems. Processing begins at 202 where the system detects some pre-checkout activity. For example, the detected activity may be the user putting items in a shopping cart in a DSA 106. Other detected activities may be used, so long as they occur before a checkout process has substantially completed. As another example, the detection of the pre-checkout activity may be the user clicking a button to initiate a checkout process. The button click or other event may transmit a message to the SRCI 108 signaling the occurrence of the pre-checkout activity and causing processing to continue at 204.

Processing at 204 includes making a determination of whether the consumer and the device operated by the user (the device operating the browser 104) are recognized by at least one SRC 102 (from among the group of SRCs 102*a-n*). In the event that there are a number of possible SRCs 102*a-n*, the SRCI 108 queries each of them substantially simultaneously to determine if any of them recognize the consumer and the device. For example, the SRCI 108 may transmit digital authorization data associated with the consumer and the device to each SRC 102. Each SRC 102 may then perform processing to determine if the user and the device are known to it (e.g., by interpreting the JWTs to retrieve a consumerId and a deviceId). If an SRC 102*a-n* recognizes the consumer (and the device), the SRC 102*a-n* returns a response to the SRCI 108 which contains information identifying the SRC. Referring to the message flow of FIG. 3A, the initial processing of FIG. 3A is an example where the SRC that recognizes the customer is referred to as "SRC-a".

Figure 3A:
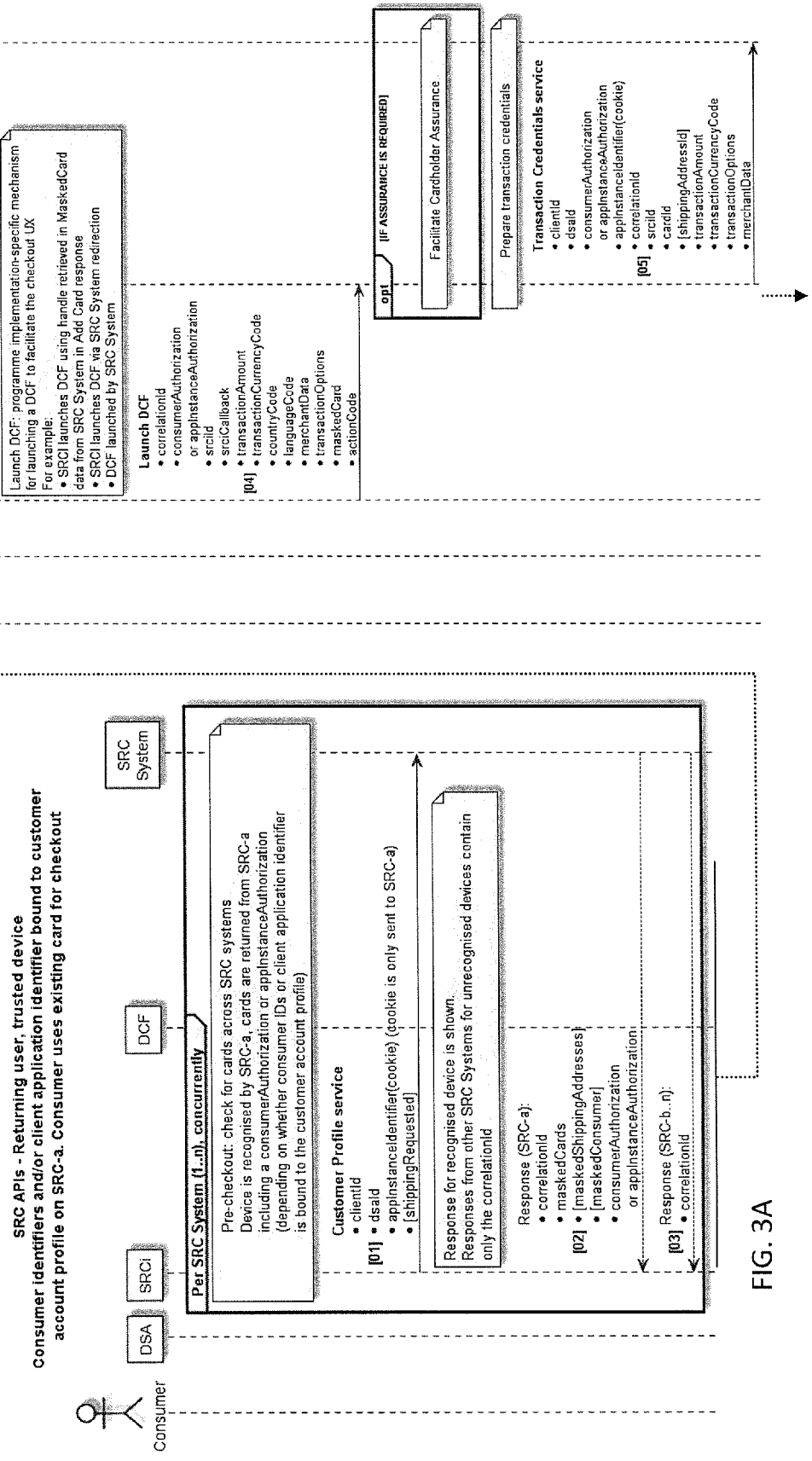
FIGS. 3A and 3B are information flow diagrams depicting a first transaction scenario in accordance with some embodiments.
Figure 3B:
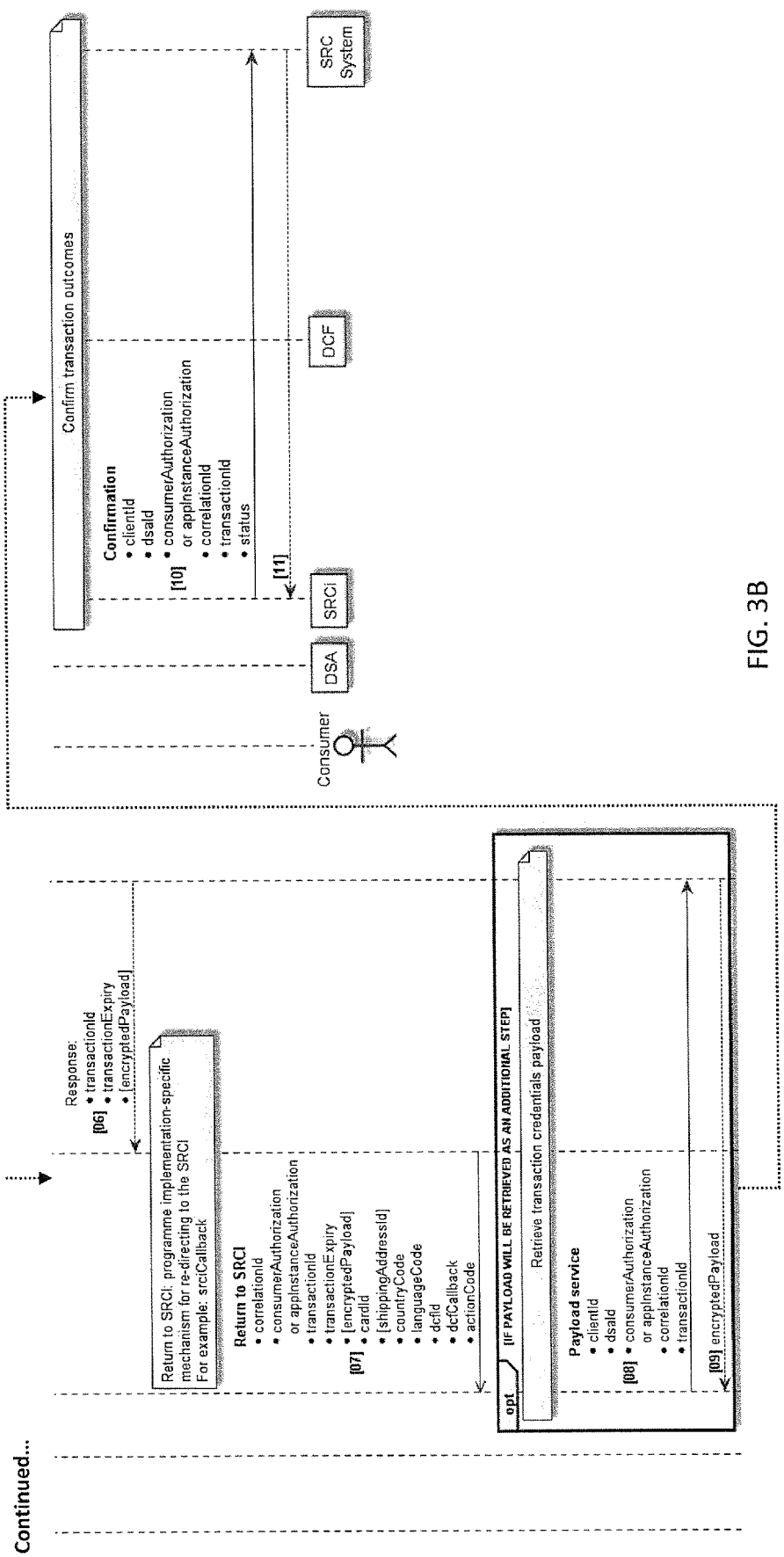

If a SRC system 102 is identified which recognizes the device and the consumer, processing continues at 206 where the SRCI 108 interacts with that identified SRC system 102 (e.g., as shown in FIG. 3A, the identified SRC is "SRC-a"). Establishing interaction with the identified SRC system 102 may include the SRCI 108 interacting with an API method of the SRC 102 referred to as the "Customer Profile service". The message is shown as message [01] and may include information including an appInstanceIdentifier (identifying the user's browser or application) as well as optional information indicating whether the merchant requests shipping information in the checkout process. In some embodiments, the message [01] is also used to determine which SRC to interact with (that is, message [01] is sent to all available SRC systems 102, and only the SRC that recognizes the consumer returns a response at [02] with consumer and card details—the other SRCs respond with only a correlation ID).

The SRC 102 returns (in message [02]) information including a correlation ID (which is a unique transaction identifier that allows, among other functions, messages to be sequenced) and card information associated with the consumer in a complex object referred to as "maskedCards". The maskedCards object may include information (for each card associated with the consumer) including a payment network ID, a URL to a card art image (or, possibly, a URL to the appropriate DCF 110*a-n* storing the consumer information), an expiry date, an optional display message for the card, an optional country code, an optional billing address, and status information associated with the card's status. The information is returned masked to the SRCI 108 and may be sent with masked consumer information (including email, phone, language, first name and last name, and other information associated with the consumer). Processing continues at 208 where the SRC that recognized the consumer and the device (SRC-a in FIG. 3A), proceeds to coordinate checkout processing with the SRCI 108. Further details of the checkout processing will be discussed further below.

Figure 4A:
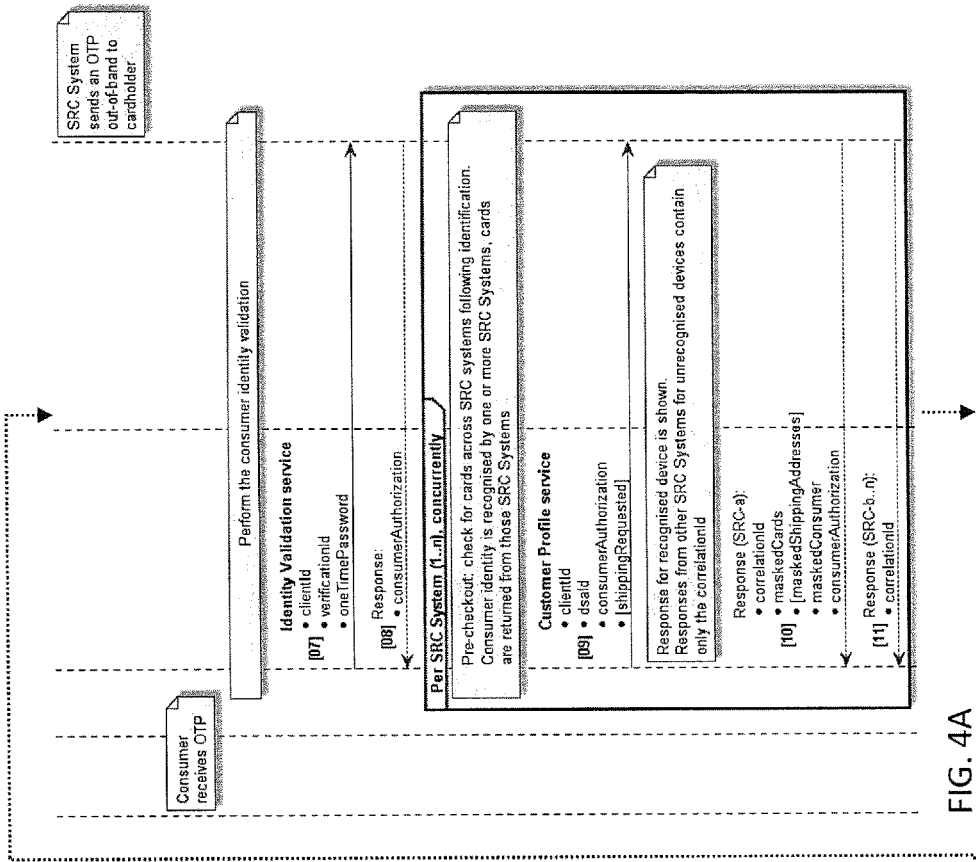
FIGS. 4A and 4B are information flow diagrams depicting a further transaction scenario in accordance with some embodiments.
Figure 4A:
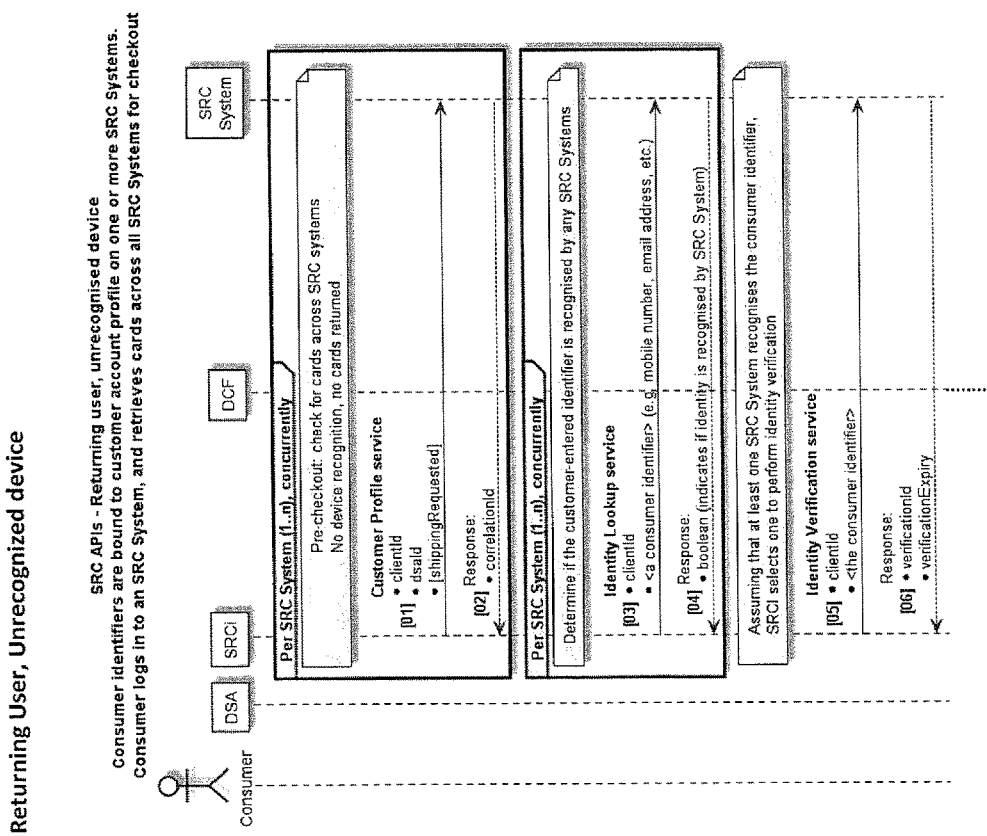
Figure 4B:
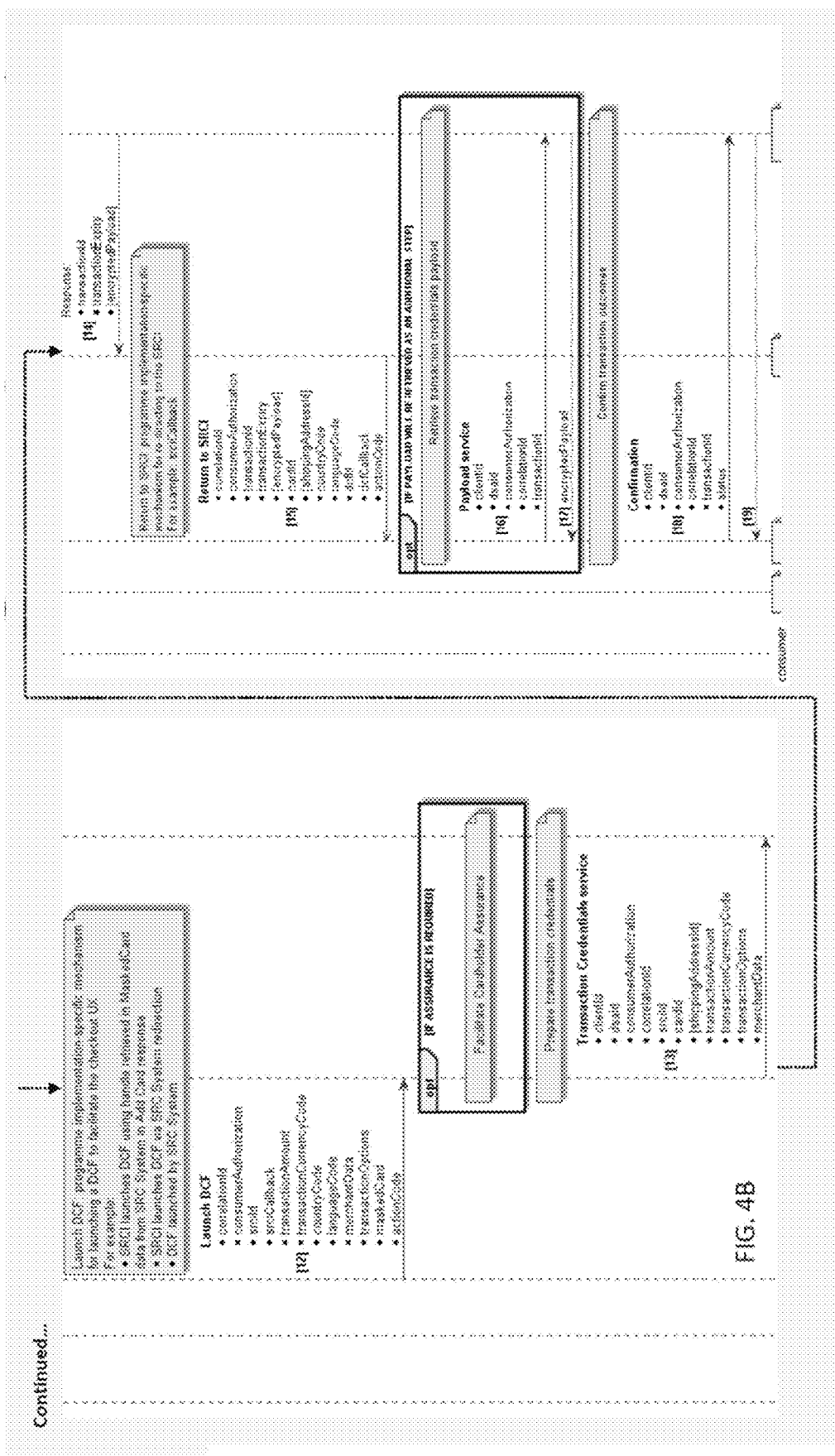

In the event that no SRC 102a-n is identified which recognizes both the consumer and the device at 204, processing continues at 210 where a determination is made whether the user can be recognized. Referring briefly to FIG. 4A, an API message flow is shown which illustrates processing at 210. As shown, processing to check across SRC systems 102 resulted in no device recognition and no cards were returned (e.g., each response in message [02] included only a correlation ID—and no further data, indicating that none of the SRC systems 102 queried were able to recognize the device and consumer based on authentication data). The processing at 210 then includes performing an Identity Lookup at [03] to transmit consumer information (such as email or phone number) to the SRC systems 102a-n to determine if any recognize the consumer based on that information. If an SRC system 102 recognizes the consumer, processing continues at 212 where the consumer is authenticated.

In this situation, authentication includes processing in which the SRCI 108 interacts with an Identity Verification API (shown in FIG. 4A at message [05]) with the SRC system 102 resulting in a one-time password ("OTP") being sent out of band to the consumer (e.g., to the consumer's email or phone), and the consumer's identity is thereby authenticated. Once the consumer has been authenticated at 212, the SRCI 108 again attempts to identify the appropriate SRC 102 to complete the checkout process (as described above). Once the appropriate SRC 102 is identified, processing continues at 208 as the SCM 108 interacts with the appropriate SRC 102 to complete the checkout process (as will be described further below).

Figure 5A:
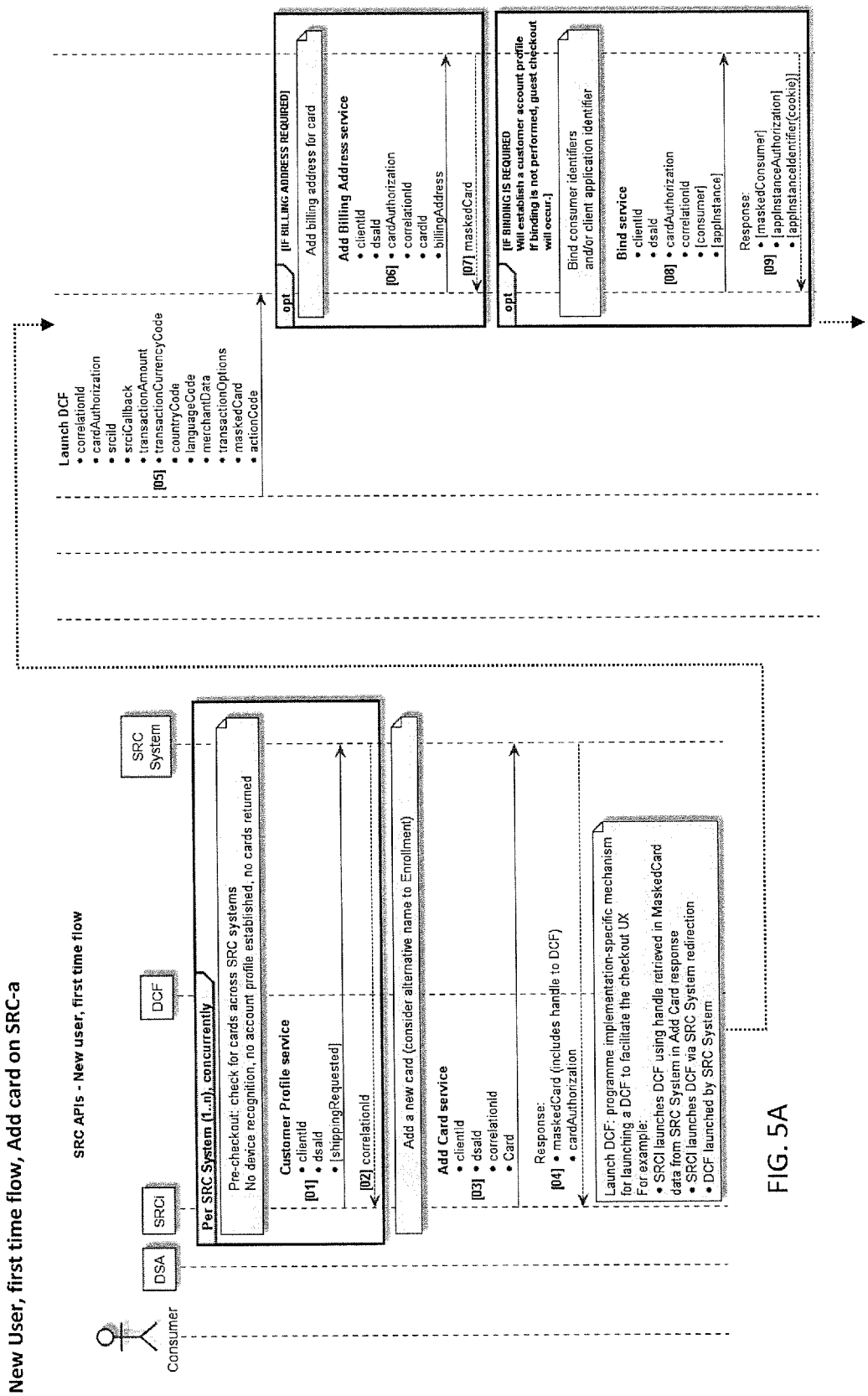
FIGS. 5A and 5B are information flow diagrams depicting a further transaction scenario in accordance with some embodiments.
Figure 5B:
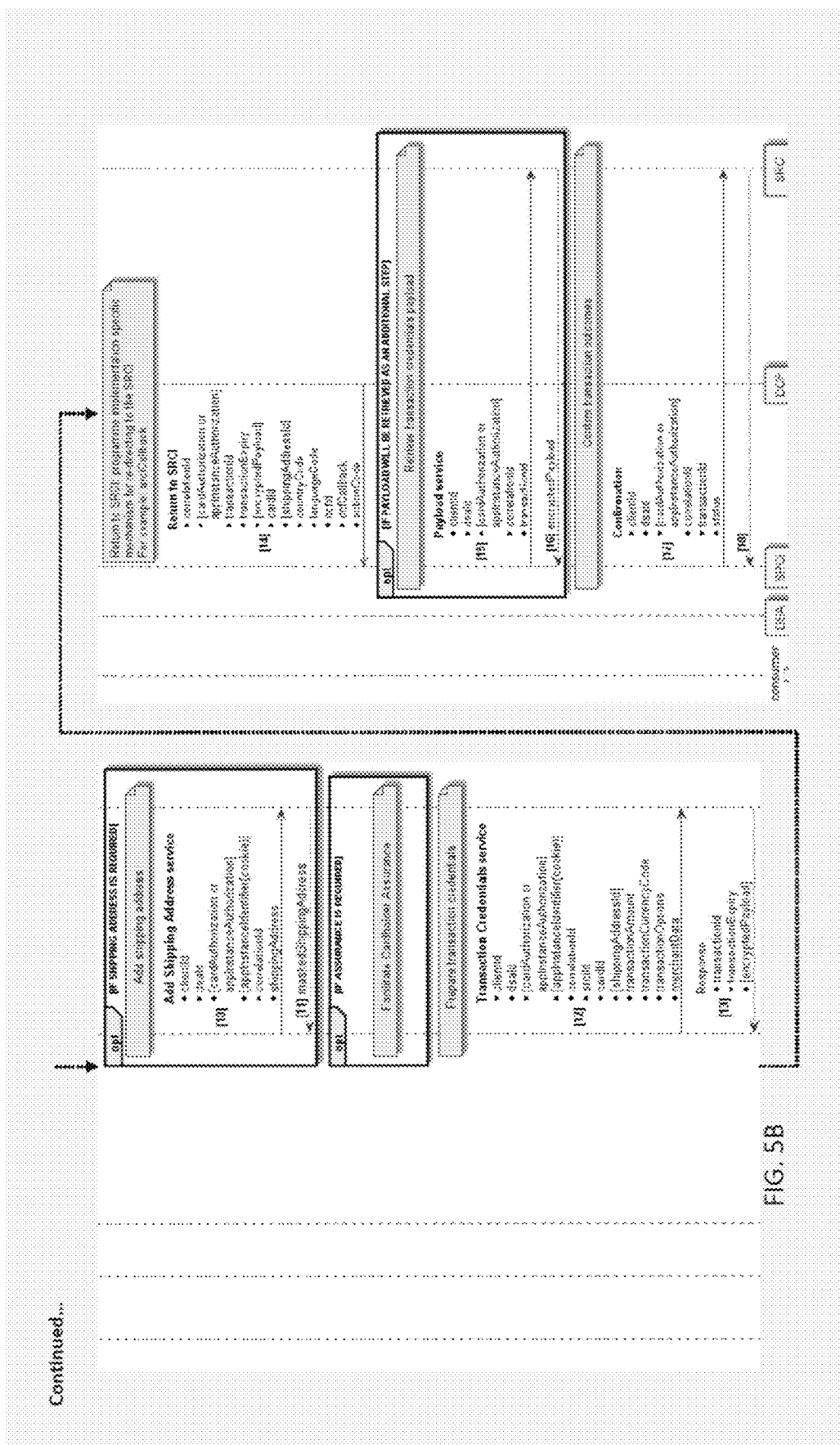

If processing at 210 indicates that there is no customer profile (also referred to as an "SRC profile") at any SRC system 102 in the system 100 (e.g., the consumer and the device are not recognized at 204, and the identity verification request at 210 fails), processing may continue at 214 where the system is operated to allow the consumer to create an SRC profile if desired. An example message flow of such a situation is shown in FIG. 5A. As in the other flows discussed above, the SRCI 108 interacts with the SRCs 102 to attempt to identify the consumer and the device. However, since the consumer is a new user, those identifications fail, and the SRCI 108 may cause the user display (through the browser 104) to change to ask the consumer whether they wish to enroll a payment card in the system of the present invention. If the consumer chooses not to enroll, processing continues to 220 and a standard checkout process is conducted.

If the consumer chooses to enroll, the SRCI 108 interacts with an Add Card API service and provides an SRC 102 with payment card information provided by the consumer. The SRC 102 redirects or otherwise facilitates an interaction between the SRCI 108 and a user interface provided by the DCF 110 in which the SRCI 108 provides information to create a consumer profile with card information. In some embodiments, the SRC 102 first provides the SRCI 108 with masked card data (which may include information identifying the DCF 110 including a URL or other information for a redirect to a user interface of the DCF 110). The consumer, the SRCI 108, the DCF 110 and the SRC 102 all interact to fill the customer profile with any required (or optional) information including a billing address for the card and a default shipping address if required. Once the profile is established, processing generally continues as described above and the SRCI 108 works with the SRC 102 to complete the transaction.

If processing can not or does not succeed at 204, 210 or 214, processing may continue at 220 where the consumer may perform a normal checkout process with the merchant (e.g., one in which the consumer provides a PAN and other information directly to the merchant for processing).

Each of the scenarios in FIG. 2 may result in processing at 208, where the SRC that either recognized the consumer or the SRC that was otherwise selected for use in processing a transaction operates to coordinate checkout processing with the SRCI 108. Details of features of some embodiments of such checkout processing 208 will now be provided by first referring to FIG. 3A, starting with message [04]. Once the appropriate SRC has been identified (in the example of FIG. 3A, the SRC identified as "SRC-a" has been identified and is coordinating the transaction), the SRCI 108 interacts with the identified DCF 110. The SRCI 108 uses information from the "maskedCard" object that was previously returned (e.g., in message [02]) to interact with a user interface provided by the appropriate DCF 110. In some embodiments, the SRCI 108 interacts directly with the appropriate DCF 110 (e.g., using a URL or other information provided in message [02]). In some embodiments, the SRC 102 performs a URL redirect to redirect the SRCI 108 to the user interface of the appropriate DCF 110. The SRC 102 may also be the same as or under common control with the DCF 110 and may directly cause an interaction between the SRCI 108 and the DCF 110.

The SRCI 108 interacts with an API method to interact with the user interface of the appropriate DCF 110 as shown in message [04] of FIG. 3A and the SRC 102. Because the SRCI 108 is in communication with the consumer (e.g., via browser 104), the SRCI 108 collects selections and other information from the consumer (e.g., such as a selection of which card from the "maskedCards" data the consumer wishes to use in the transaction). The SRCI 108 also has merchant information (such as the transaction amount, the currency and other merchant data). This information is provided to the SRC 102 via a user interface of the DCF 110. The DCF 110 then requests that the SRC 102 prepare transaction credentials. The SRC 102 upon receipt of the request to prepare transaction credentials, responds with a transaction identifier, an expiry of the transaction credentials, and an encrypted payload. Pursuant to some embodiments, the encrypted payload provides a standardized, consistent and secure set of customer payment information that is provided to merchants (through SRCIs) to facilitate transactions. The payload generally contains information including: payment card data including a PAN (if a card is used instead of a token), payment token data (if a token is used instead of a card), a shipping address for delivery of the goods or services being purchased (if required), a consumer email address (if the email address is available in the SRC profile and the email address is requested), the consumers name (first and last if available and if requested), the consumer's mobile phone number (if available in the profile and requested), billing address (if available in the profile and if requested), optional validation data (such as 3D Secure data if available or required). Other optional data may be included in the payload to facilitate standardization of payloads and transactions as well as to protect transactions with dynamic data (e.g., by transmitting transaction unique data or unique cryptograms per transaction). The payload is encrypted (using, for example, a public key of the requesting SRCI 108) and provided to the DCF 110 in message [06] of FIG. 3A and is provided to the SRCI 108 in message [07] along with other transaction information so that the SRCI 108 can complete the transaction using the payload. In some embodiments, the DCF 110 does not provide the payload to the SRCI 108 and instead, the SRCI 108 invokes a payload request API to retrieve the payload directly from the SRC 102. The SRCI 108 then uses the encrypted payload to create a standard payment system authorization request message to request authorization of the transaction (involving the merchant, the consumer's payment card or token of the payment card, for the transaction amount). Such an authorization request message may be transmitted to a payment network using conventional means and an authorization response message may be received indicating whether the transaction is authorized. The transaction outcome (e.g., whether the transaction was authorized or declined) is then communicated from the SRCI 108 to the SRC 102 to complete the transaction.

The result is a secure transaction approach which ensures a consistent experience for consumers and merchants which reduces the need for manual entry and storage of PAN information in merchant websites or applications. Further, embodiments ensure delivery of payment card data to merchants which is both secure and consistent. Embodiments reduce integration and security complexity for merchants while providing a standardized checkout experience for consumers.

Figure 6A:
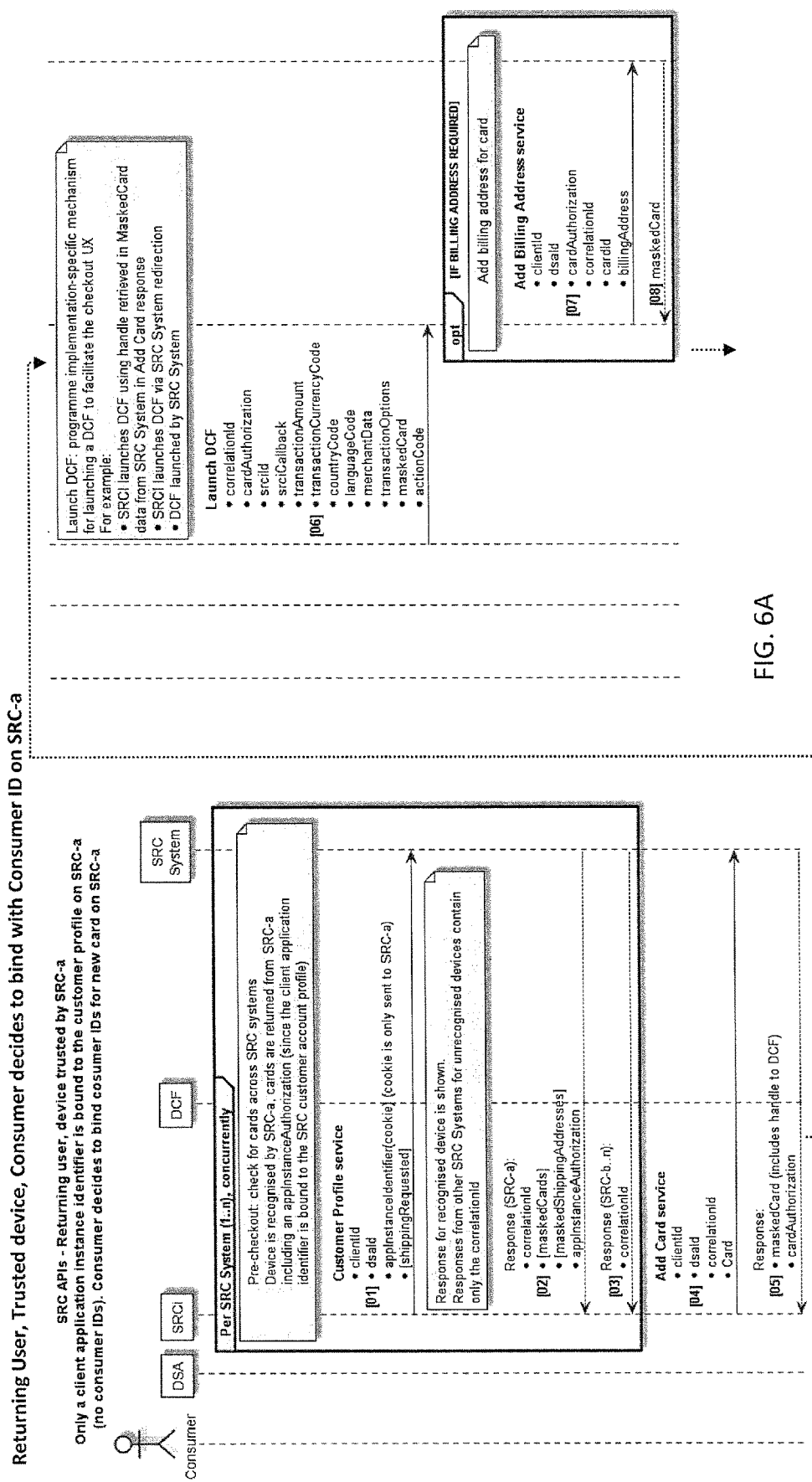
FIGS. 6A-6C are information flow diagrams depicting a further transaction scenario in accordance with some embodiments.
Figure 6B:
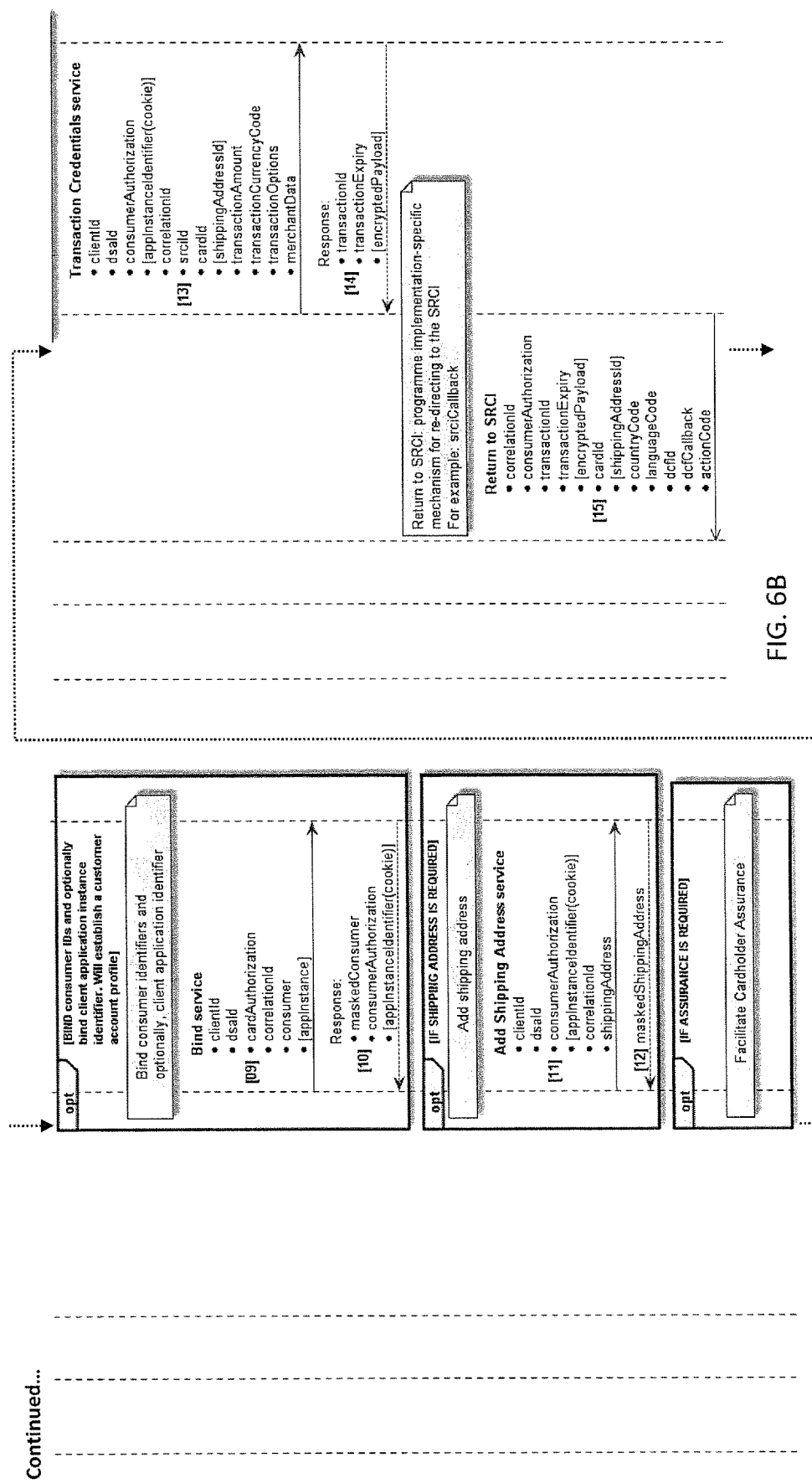
Figure 6C:
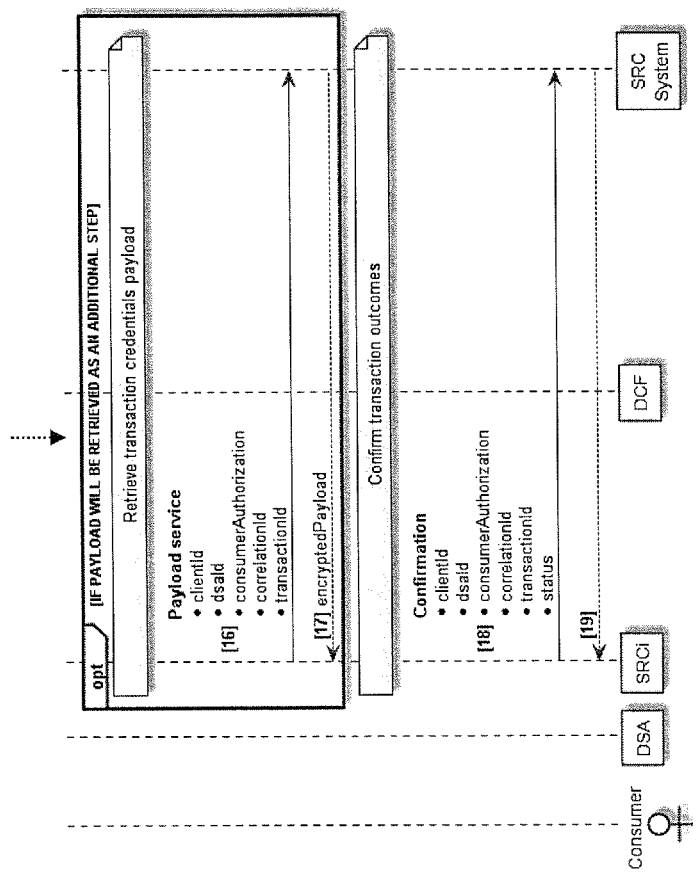

A number of variations of transaction processing may be provided. For example, as discussed above, a scenario was described in which a new user is able to create a profile and conduct a transaction, a scenario where a returning consumer and a recognized device conducted a transaction, and a scenario where a returning consumer with an unrecognized device conducted a transaction. As another illustrative example, embodiments allow consumers operating trusted devices to bind new consumer IDs for a new card in a profile with a specific SRC system 102. An illustration of such an embodiment is shown in FIG. 6A-6C.

Figure 7A:
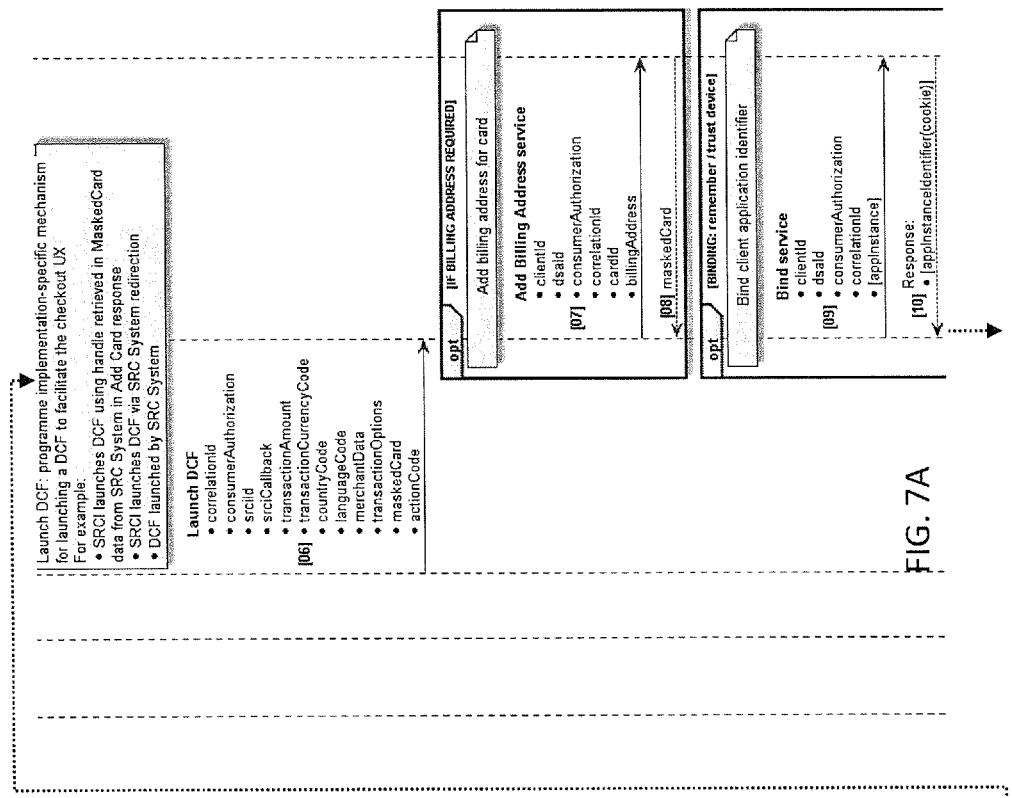
FIGS. 7A and 7B are information flow diagrams depicting a further transaction scenario in accordance with some embodiments.
Figure 7A:
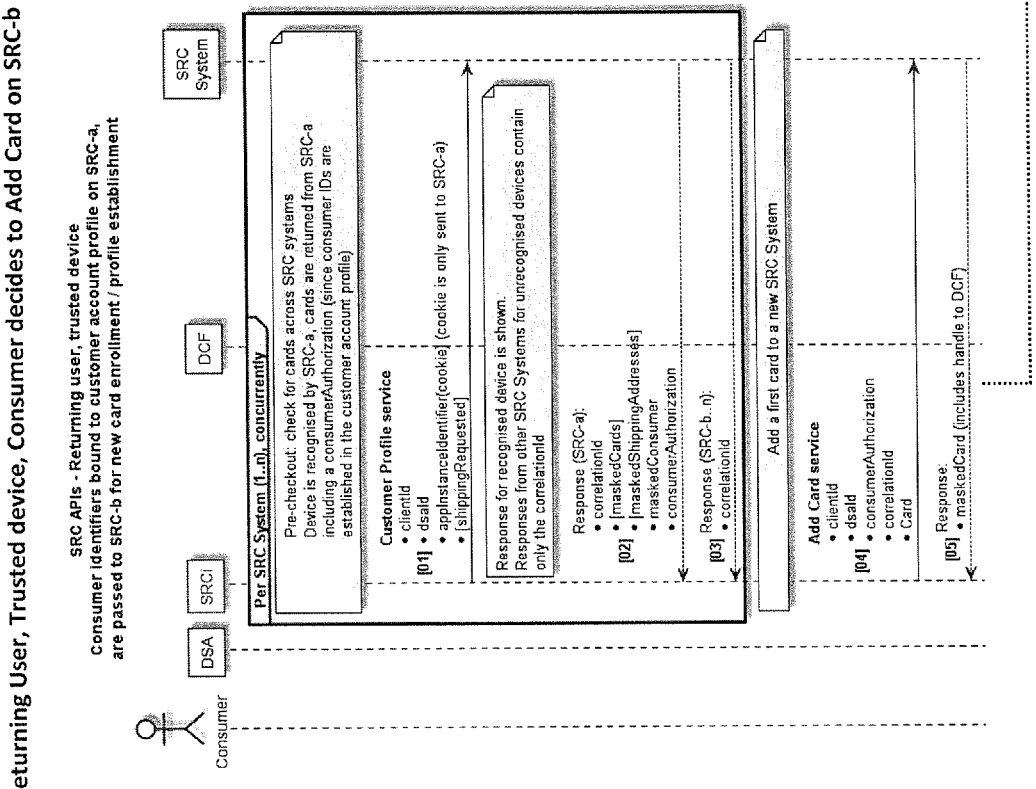
Figure 7B:
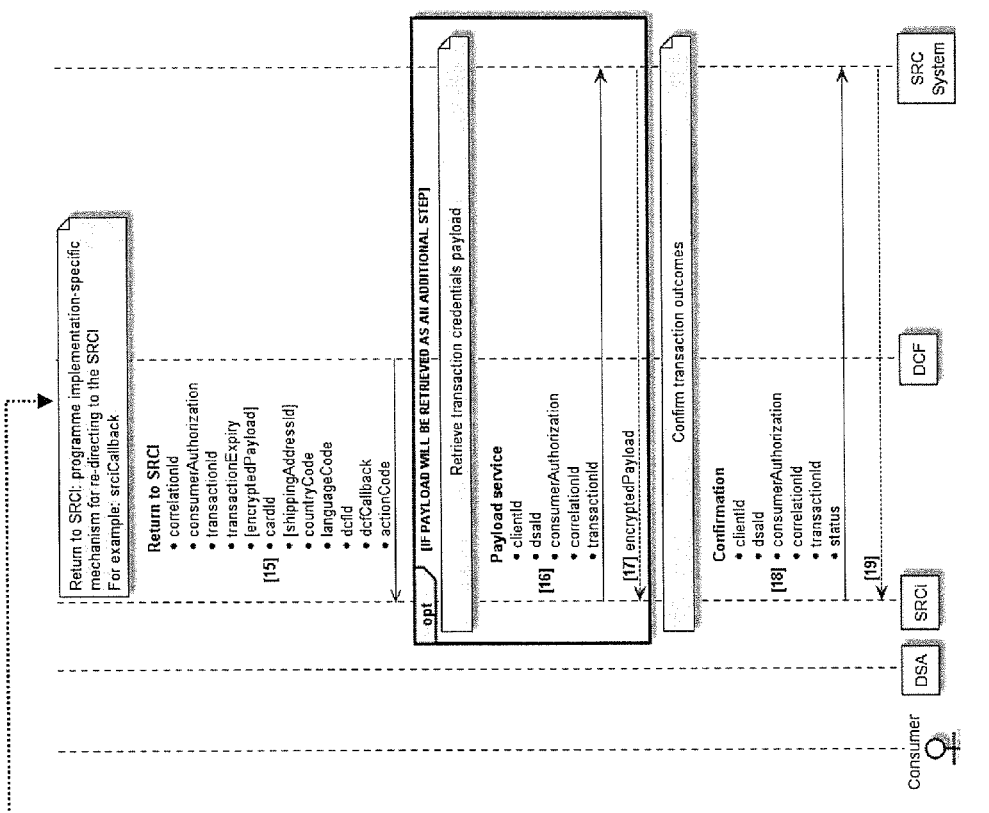

As a still further illustrative example, embodiments of the present invention allow returning consumers operating trusted devices who have a profile on a specific SRC system 102 to create a new profile (and add a new card) on a different SRC system 102. An example of such a flow is shown in FIG. 7A-7B.

The embodiments described herein may be implemented using any number of different hardware configurations. Embodiments described herein may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 8:
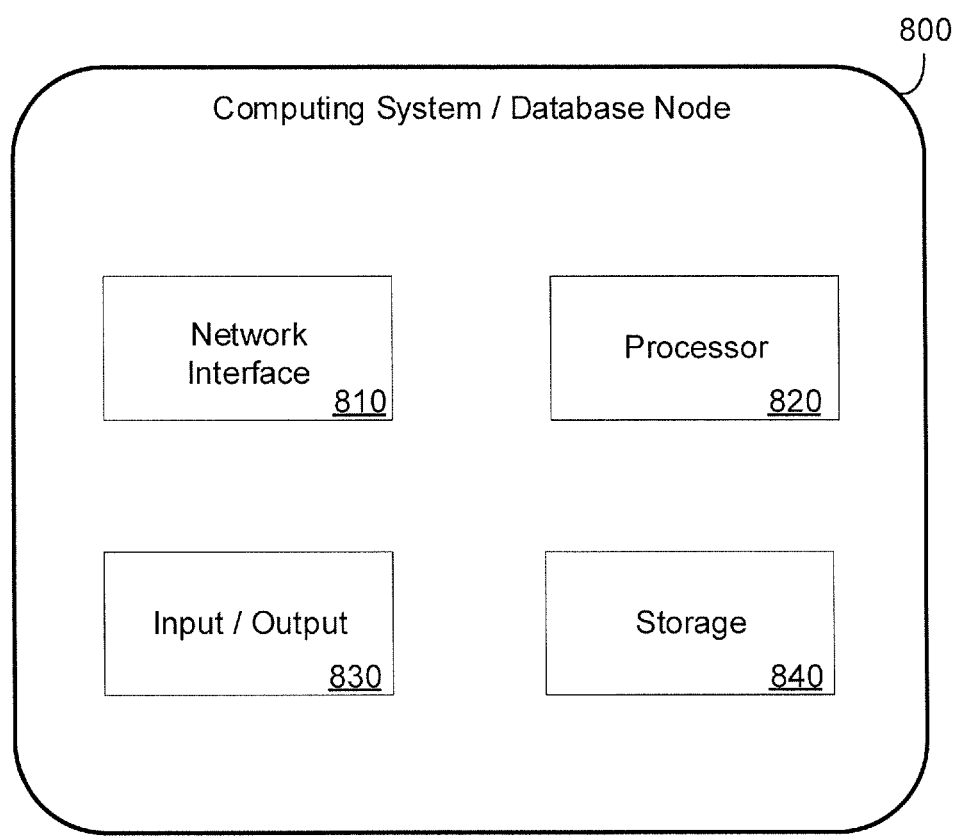
FIG. 8 is a block diagram of an apparatus in accordance with some embodiments of the present invention.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 8 illustrates an example computing system 800 which may represent or be integrated in any of the above-described components (such as, for example, the SRC system 102). FIG. 8 is not intended to suggest any limitation as to the scope of use or functionality of embodiments described herein. The computing system 800 is capable of being implemented and/or performing any of the functionality set forth hereinabove.

The computing system 800 may include a computer system/server, which is operational with numerous other general-purpose or special purpose computing system environments or configurations. Examples of well-known computing systems, environments, and/or configurations that may be suitable for use as computing system 800 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like.

The computing system 800 may be described in the general context of computer system-executable instructions, such as program modules, being executed by a computer system. Generally, program modules may include routines, programs, objects, components, logic, data structures, and so on that perform particular tasks or implement particular abstract data types. The computing system 800 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 8, the computing system 800 is shown in the form of a general-purpose computing device. The components of computing system 800 may include, but are not limited to, a network interface 810, one or more processors or processing units 820, an output 830 which may include a port, an interface, etc., or other hardware, for outputting a data signal to another device such as a display, a printer, etc., and a storage device 840 which may include a system memory, or the like. Although not shown, the computing system 800 may also include a system bus that couples various system components including system memory to the processor 820.

The storage device 840 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 840 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to the bus by one or more data media interfaces. As will be further depicted and described below, storage device 840 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 800 may also communicate with one or more external devices such as a keyboard, a pointing device, a display, etc.; one or more devices that enable a user to interact with computer system/server; and/or any devices (e.g., network card, modem, etc.) that enable computing system 800 to communicate with one or more other computing devices. Such communication can occur via I/O interfaces. Further, computing system 800 can communicate with one or more networks such as a local area network (LAN), a general wide area network (WAN), and/or a public network (e.g., the Internet) via network interface 810. As depicted, network interface 810 may also include a network adapter that communicates with the other components of computing system 800 via a bus. Although not shown, other hardware and/or software components could be used in conjunction with the computing system 800. Examples include, but are not limited to: microcode, device drivers, redundant processing units, external disk drive arrays, RAID systems, tape drives, and data archival storage systems, etc.

Pursuant to some embodiments, the computing system 800 may be a user device (e.g., such as a mobile phone, tablet computer, personal computer or the like) operated by a user to display from a merchant website during a purchase transaction involving the secure remote commerce system of the present invention.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

Figure 9A:
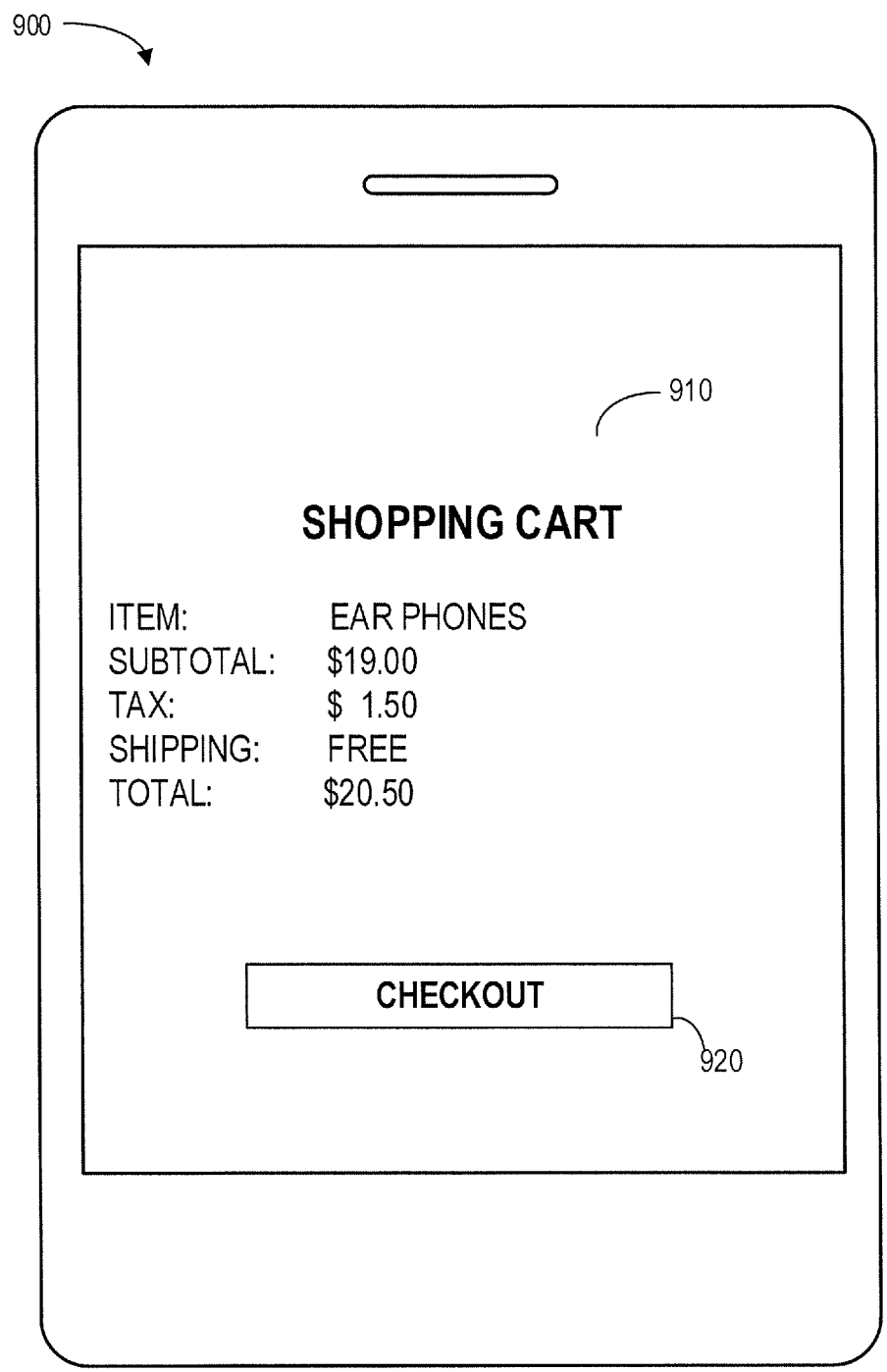
FIGS. 9A-9D are examples of a mobile device display that might be provided in accordance with some embodiments.
Figure 9B:
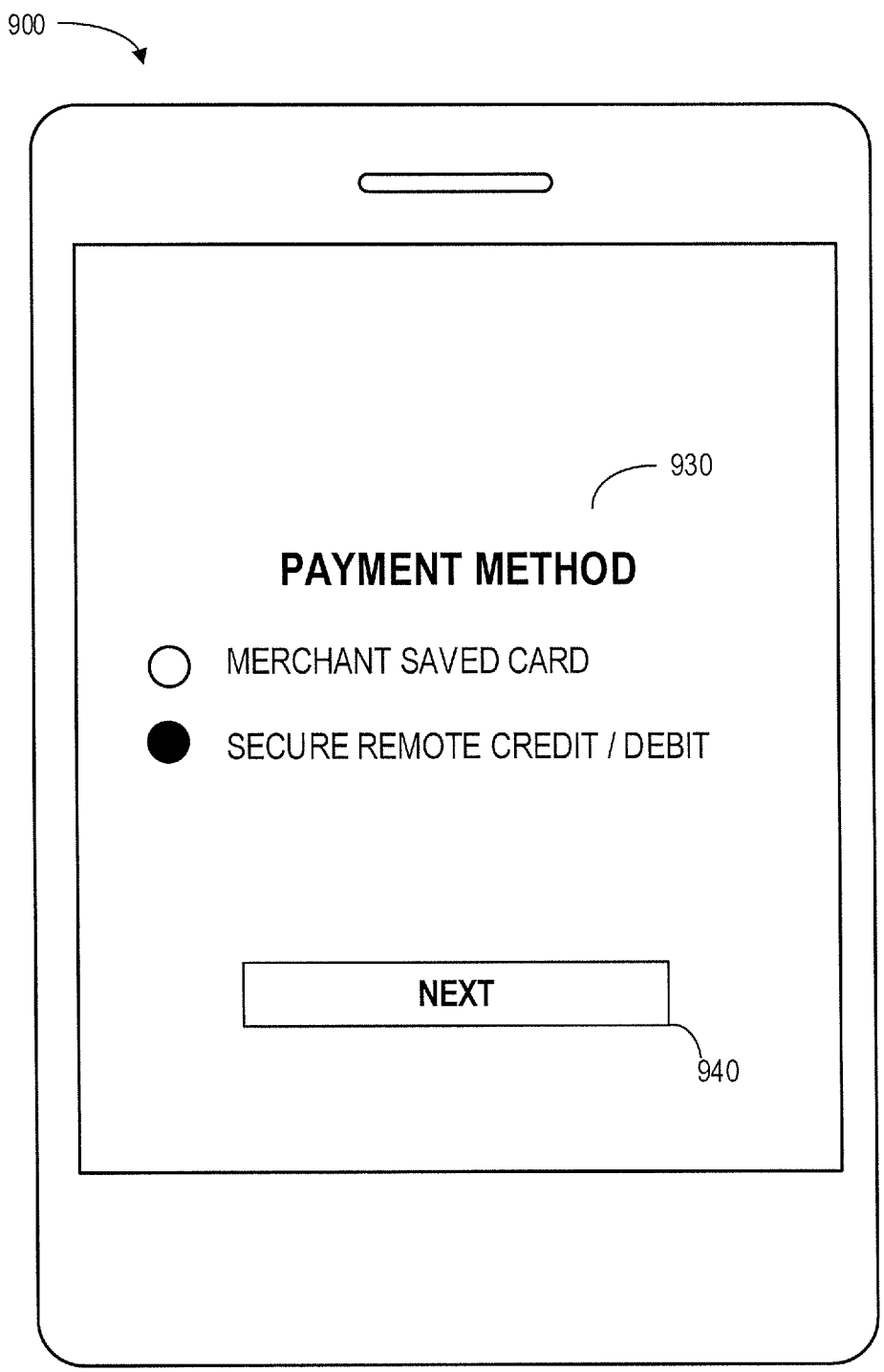

As discussed above, embodiments provide a consistent user experience for users who are engaging in remote commerce transactions. Features of some of the user experience of some embodiments will now be described by reference to FIGS. 9A-9D which show examples of a series of mobile device 900 displays that might be provided in accordance with some embodiments. In the illustrative embodiment shown in FIG. 9, a user operating a mobile device 900 is interacting with a merchant to purchase an item. In the display of FIG. 9A, the user has selected an item to purchase and placed the item in a shopping cart 910. The user initiates a checkout process pursuant to the present invention by clicking on a checkout button 920, which both takes the user to a display of FIG. 9B and also initiates processing pursuant to the present invention.

For example, clicking on the checkout button 920 may be the activity that initiates the processing of FIG. 2 (e.g., clicking the checkout button 920 may be the action to "detect pre-checkout activity 202" of FIG. 2). While the display of FIG. 9B renders, the process 200 of FIG. 2 may be performed. As shown in the illustrative display of FIG. 9B, the user is a recognized user (as determined by step 204 of FIG. 2) and the display shows that the user may select from either a stored card (stored in association with the merchant website, for example) or one or more secure remote credit or debit cards associated with the user pursuant to the present invention. The user opts to use a secure remote credit or debit card and clicks on a button 940 to navigate to the next illustrative display in FIG. 9C.

Figure 9C:
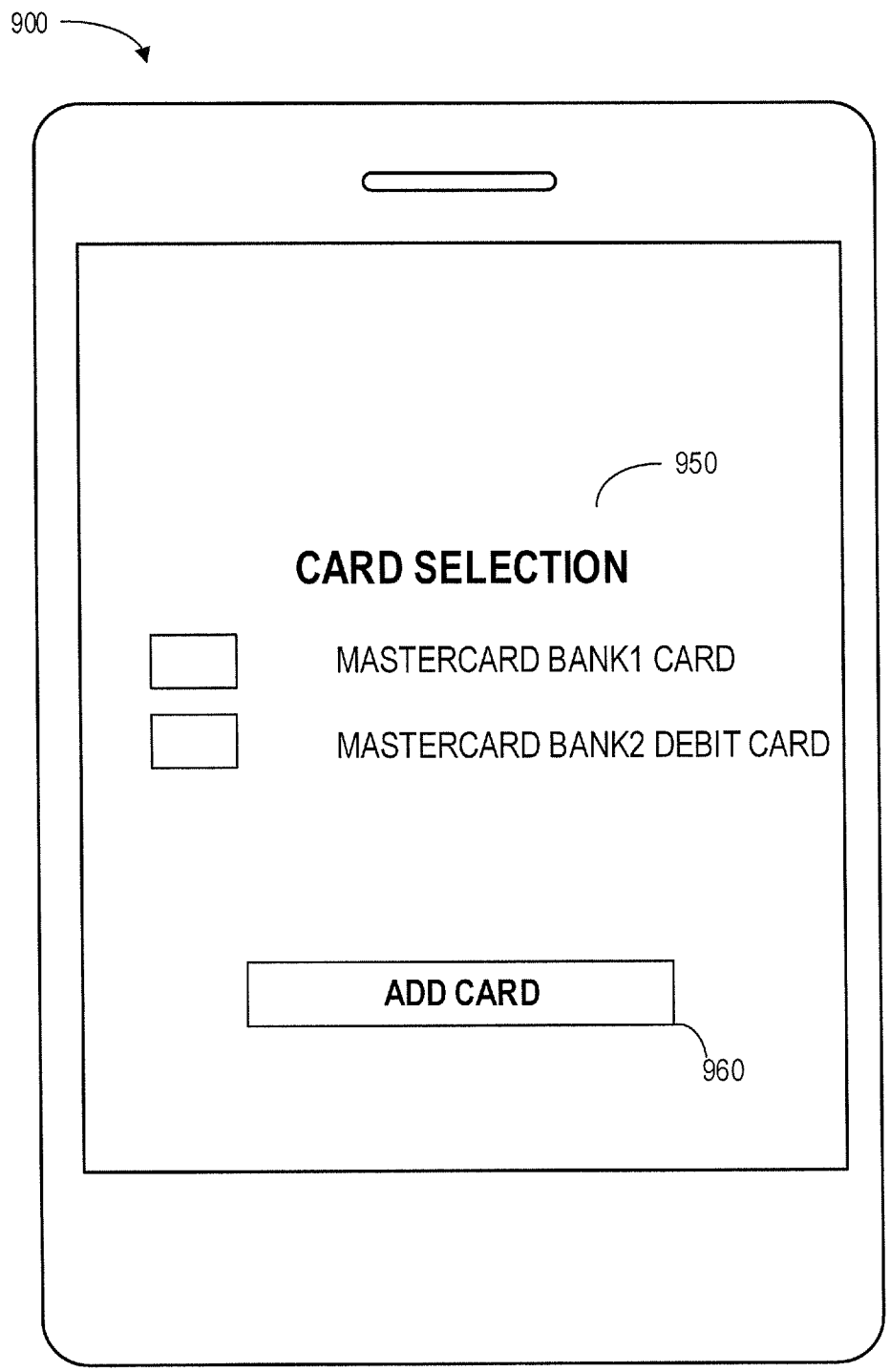

As shown in FIG. 9C, a display is presented to the user which shows cards that may be selected for use by the user. The display may show card art associated with each card as well as a name or other information associated with each card. Some or all of the display of FIG. 9C may be provided by a DCF 110 (as shown in FIG. 1). Pursuant to some embodiments, the cards that are shown may be retrieved from multiple SRCs 102. That is, during the pre-checkout processing, as the SCRI 108 attempts to identify an appropriate SRC 102 to use to complete the transaction, the SRCI 108 may identify that there are multiple SRC systems 102 that have customer profile information. The SRCI 108 may bind the transaction to a specific SRC 102 for completion, but it may also still retrieve profile information from the other SRC systems 102. Referring again to FIG. 9C, the user may also be provided with an option to add a new card 960. The customer selects a card (e.g., by clicking on the card name or the card image) to complete the checkout using that card, and the user is presented with a checkout display 970 as shown in FIG. 9D.

Figure 9D:
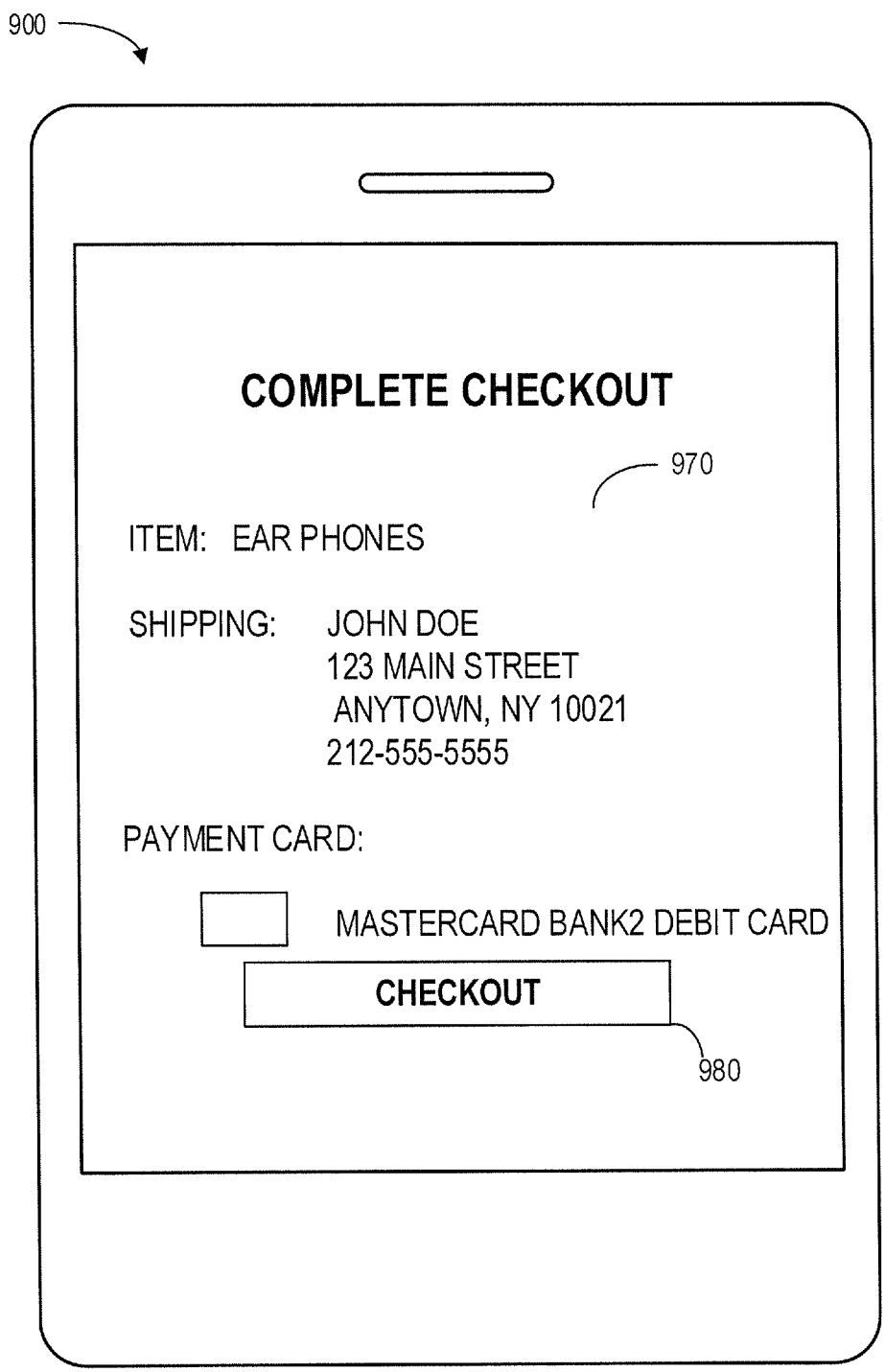

The illustrative checkout display 970 of FIG. 9D shows the item to be purchased as well as shipping information retrieved from the SRC 102 and the selected payment card. In a typical user interface (but not shown in FIG. 9D), the user may be presented with options to modify or otherwise edit one or more of the item, the shipping address, and the selected payment card. Upon selecting the checkout button 980, the SRC system causes a payment payload to be processed using a payment card network, crediting the merchant with the transaction amount and providing the merchant with a confirmation so that the user can be provided with the purchased product.

The user interfaces shown to a user may vary depending on the user's device (whether it is a trusted device or not) and the user's authentication status. For example, if the user is not authenticated, display screens may be presented to the user prompting the user for authentication information. In general, however, the user interfaces presented to the user are consistent across merchants and no matter which SRC provider or SRC initiator a user is interacting with. Further, because PAN or other sensitive payment information are not provided directly to a merchant or merchant systems, security is increased.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of enterprise applications, embodiments may instead be associated with other types of applications in additional to and/or instead of the ones described herein (e.g., financial applications, medical applications, manufacturing applications, etc.). Similarly, although certain attributes were described in connection some embodiments herein, other types of attributes might be used instead.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A computerized method to facilitate a secure remote transaction, comprising:
    detecting an event identifying initiation of a checkout process involving a transaction between a consumer and a merchant;
    querying one or more secure remote commerce systems to identify a particular secure remote commerce system which recognizes the consumer, the particular secure remote commerce system to use in facilitating the transaction, the secure remote commerce system storing a consumer profile including information identifying at least a first payment card of the consumer;
    modifying a checkout user interface displayed to the consumer based on information from the consumer profile to display information associated with the at least first payment card;
    receiving a checkout request from the consumer;
    obtaining a payload from the secure remote commerce system including information identifying the at least first payment card, the merchant and transaction details; and
    using the payload to complete a transaction authorization request with a payment network;
    wherein identifying a secure remote commerce system includes transmitting a request message to a plurality of secure remote commerce systems with information associated with the consumer and a device operated by the consumer.

2. The computerized method of claim 1, further comprising:
    receiving a successful authorization response from the payment network; and
    completing the transaction.

3. The computerized method of claim 1, further comprising:
    receiving a response from at least a first secure remote commerce system including information indicating that the consumer and the device are known to the at least first secure remote commerce system; and
    identifying the at least first secure remote commerce system as the secure remote commerce system to use in facilitating the transaction.

4. The computerized method of claim 1, further comprising:
    receiving a response from each of the plurality of secure remote commerce systems with information indicating that the device is not known to each of the plurality of secure remote commerce systems.

5. The computerized method of claim 4, further comprising:
    transmitting a consumer identifier to each of the plurality of secure remote commerce systems;
    receiving a response from at least a first secure remote commerce system including information indicating that the consumer identifier is known to the at least first secure remote commerce system.

6. The computerized method of claim 5, further comprising:
    invoking an identity validation service to validate the identity of the consumer; and
    identifying the at least first secure remote commerce system as the secure remote commerce system to use in facilitating the transaction.

7. The computerized method of claim 4, further comprising:
    transmitting a consumer identifier to each of the plurality of secure remote commerce systems;
    receiving a response from each of the plurality of secure remote commerce systems including information indicating that the consumer identifier is not known; and
    modifying a checkout user interface displayed to the consumer to prompt the consumer to enroll at least a first payment card with an at least first secure remote commerce system.

8. The computerized method of claim 1, wherein the payload is encrypted by a public key of the entity using the payload to complete the transaction authorization request.

9. A system to facilitate secure remote transactions, comprising:
(a) a first communication port to exchange information associated with a digital shopping application and a consumer interacting with the digital shopping application using a device;
(b) a secure remote commerce initiator system, coupled to the first communication port, including a computer processor a memory storing instructions to cause the computer processor to:
(i) listen for an event identifying initiation of a checkout process involving a transaction between the consumer and the digital shopping application,
(ii) responsive to the event, querying one or more secure remote commerce systems to identify a particular secure remote commerce system which recognizes the consumer, the particular secure remote commerce system to use in facilitating the transaction, the secure remote commerce system storing a consumer profile including information identifying at least a first payment card of the consumer,
(iii) cause a checkout user interface displayed to the consumer to change based on information associated with the consumer profile,
(iv) receive a checkout request from the consumer,
(v) obtain a payload from the secure remote commerce system including information identifying the at least first payment card, the merchant and transaction details, and
(vi) create a transaction authorization request message using the payload; and
(c) a second communication output port coupled to the secure remote commerce initiator system to facilitate transmission of the transaction authorization request message to a payment network to authorize the transaction;
wherein identifying a secure remote commerce system includes instructions to cause the computer processor to transmit a request message to a plurality of secure remote commerce systems with information associated with the consumer and a device operated by the consumer.

10. The system of claim 9, further comprising causing the computer processor to:
receive a response from at least a first secure remote commerce system including information indicating that the consumer and the device are known to the at least first secure remote commerce system; and
identify the at least first secure remote commerce system as the secure remote commerce system to use in facilitating the transaction.

11. The system of claim 9, further comprising causing the computer processor to:
receive a response from each of the plurality of secure remote commerce systems with information indicating that the device is not known to each of the plurality of secure remote commerce systems.

12. The system of claim 11, further comprising causing the processor to:
transmit a consumer identifier to each of the plurality of secure remote commerce systems;
receive a response from at least a first secure remote commerce system including information indicating that the consumer identifier is known to the at least first secure remote commerce system.

13. The system of claim 12, further comprising causing the processor to:
invoke an identity validation service to validate the identity of the consumer; and
identify the at least first secure remote commerce system as the secure remote commerce system to use in facilitating the transaction.

14. The system of claim 11, further comprising causing the processor to:
transmit a consumer identifier to each of the plurality of secure remote commerce systems;
receive a response from each of the plurality of secure remote commerce systems including information indicating that the consumer identifier is not known; and
modify a checkout user interface displayed to the consumer to prompt the consumer to enroll at least a first payment card with an at least first secure remote commerce system.

15. A non-tangible, computer-readable medium storing instructions, that, when executed by a processor, cause the processor to perform a method to facilitate software development and operations for an enterprise, the method comprising:
detecting an event identifying initiation of a checkout process involving a transaction between a consumer and a merchant;
querying one or more secure remote commerce systems to identify a particular secure remote commerce system which recognizes the consumer, the particular secure remote commerce system to use in facilitating the transaction, the secure remote commerce system storing a consumer profile including information identifying at least a first payment card of the consumer;
modifying a checkout user interface displayed to the consumer based on information from the consumer profile to display information associated with the at least first payment card;
receiving a checkout request from the consumer;
obtaining a payload from the secure remote commerce system including information identifying the at least first payment card, the merchant and transaction details; and
using the payload to complete a transaction authorization request with a payment network;
wherein identifying a secure remote commerce system includes transmitting a request message to a plurality of secure remote commerce systems with information associated with the consumer and a device operated by the consumer.

16. The medium of claim 15, further comprising:
receiving a successful authorization response from the payment network; and
completing the transaction.

* * * * *